United States Patent
Tachibana

(10) Patent No.: US 11,070,693 B2
(45) Date of Patent: Jul. 20, 2021

(54) IMAGE FORMING APPARATUS THAT DISPLAYS A PAPER FEED UNIT SELECTION SCREEN

(71) Applicant: CANON KABUSHIKI KAISHA, Tokyo (JP)

(72) Inventor: Yoshiro Tachibana, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/192,144

(22) Filed: Nov. 15, 2018

(65) Prior Publication Data

US 2019/0089855 A1   Mar. 21, 2019

Related U.S. Application Data

(63) Continuation of application No. 15/232,648, filed on Aug. 9, 2016, now Pat. No. 10,212,297, which is a
(Continued)

(30) Foreign Application Priority Data

Aug. 28, 2012   (JP) ................. 2012-188069

(51) Int. Cl.
*H04N 1/00*     (2006.01)
*G06K 15/16*    (2006.01)
(Continued)

(52) U.S. Cl.
CPC ....... *H04N 1/00663* (2013.01); *G03G 15/502* (2013.01); *G03G 15/6508* (2013.01);
(Continued)

(58) Field of Classification Search
CPC .................. H04N 1/00663; H04N 1/0411
See application file for complete search history.

(56) References Cited

U.S. PATENT DOCUMENTS 8,203,729 B2    6/2012  Miyake et al.
8,351,065 B2 *  1/2013  Nishii .................. G06K 15/005
                                                    271/9.01
(Continued)

FOREIGN PATENT DOCUMENTS

CN    101004669 A    7/2007
CN    101290492 A   10/2008
(Continued)

OTHER PUBLICATIONS

Extended European Search Report dated Dec. 7, 2017, issued in corresponding European Patent Application No. 13003812.8.
(Continued)

*Primary Examiner* — Benjamin O Dulaney
(74) *Attorney, Agent, or Firm* — Venable LLP

(57) ABSTRACT

A printing apparatus includes a display that displays one of a first list including information of part of a plurality of sheet holding units, and a second list, including information of another sheet holding unit, of the plurality of sheet holding units, which is not displayed in the first list, and a user interface that receives a change instruction for changing the first list to the second list. The printing apparatus also includes a controller that controls the display based on the received change instruction received, such that, when an empty state occurs in a sheet holding unit of the part of the plurality of sheet holding units included in the information of the first list, the display initially displays the first list, and, when an empty state occurs in the other sheet holding unit included in the information of the second list, the display initially displays the second list.

28 Claims, 31 Drawing Sheets

Related U.S. Application Data continuation of application No. 13/960,535, filed on Aug. 6, 2013, now Pat. No. 9,432,537.

(51) Int. Cl.
  *G03G 15/00* (2006.01)
  *G06F 3/12* (2006.01)

(52) U.S. Cl.
  CPC .......... *G06F 3/1205* (2013.01); *G06F 3/1211* (2013.01); *G06K 15/16* (2013.01); *H04N 1/00411* (2013.01)

(56) References Cited

U.S. PATENT DOCUMENTS

| | | |
|---|---|---|
| 8,570,580 B2 | 10/2013 | Tachibana |
| 8,605,324 B2 | 12/2013 | Katoh |
| 8,693,026 B2 | 4/2014 | Takahashi |
| 2005/0185993 A1 | 8/2005 | Kobayashi |
| 2005/0213996 A1 | 9/2005 | Amano et al. |
| 2005/0270557 A1 | 12/2005 | Ookuma |
| 2006/0092453 A1 | 5/2006 | Okada et al. |
| 2006/0115282 A1 | 6/2006 | Yamashita |
| 2007/0146789 A1 | 6/2007 | Mima et al. |
| 2007/0252824 A1 | 11/2007 | Okada et al. |
| 2008/0003011 A1 | 1/2008 | Unno |
| 2008/0131145 A1* | 6/2008 | Tao ................... G03G 15/234 399/21 |
| 2009/0262379 A1* | 10/2009 | Miyake .............. G03G 15/5004 358/1.13 |
| 2010/0046977 A1* | 2/2010 | Inenaga ............. H04N 1/00482 399/81 |
| 2011/0043843 A1 | 2/2011 | Nishiyama |
| 2011/0135322 A1 | 6/2011 | Masuyama |
| 2011/0164276 A1* | 7/2011 | Hata .................... G06F 3/1204 358/1.15 |
| 2011/0199644 A1 | 8/2011 | Asai et al. |
| 2011/0222097 A1* | 9/2011 | Miyoshi ............. H04N 1/00408 358/1.13 |
| 2011/0235129 A1* | 9/2011 | Ohkawa ............. H04N 1/00002 358/406 |
| 2012/0268771 A1* | 10/2012 | Kruizinga ......... H04N 1/32657 358/1.14 |
| 2013/0033721 A1 | 2/2013 | Miyamoto |

FOREIGN PATENT DOCUMENTS

| | | |
|---|---|---|
| CN | 101494708 A | 7/2009 |
| CN | 101526794 A | 9/2009 |
| CN | 102196126 A | 9/2011 |
| JP | 2007-243313 A | 9/2007 |
| JP | 2009-210683 A | 9/2009 |
| JP | 2010-137923 A | 6/2010 |
| JP | 2012-063552 A | 3/2012 |
| RU | 2 346 820 C2 | 2/2009 |

OTHER PUBLICATIONS

Office Action dated Dec. 5, 2017, issued in counterpart Russian Patent Application No. 2016146331.
Chinese Office Action dated Jun. 3, 2020, in related Chinese Patent Application No. 201711396932.2 (with English ranslation).

* cited by examiner

F I G. 6

PAPER FEED DECK MANAGEMENT TABLE

| PAPER FEED DECK ID | PAPER SIZE | PAPER TYPE | NAME | GRAMMAGE | REMAINING PAPER AMOUNT |
|---|---|---|---|---|---|
| 1 | B4 | THICK PAPER 1 | THICK PAPER 1(106~128g/m²) | 117g/m² | 100% |
| 2 | B5 | PLAIN PAPER | PLAIN PAPER(80~105g/m²) | 85g/m² | 100% |
| 3 | LTR | TAB PAPER 2 | TAB PAPER 2(181~209g/m²) | 190g/m² | 100% |
| 4 | B4 | THICK PAPER 2 | THICK PAPER 2(129~150g/m²) | 140g/m² | 100% |
| 5 | B5 | THIN PAPER | THIN PAPER(64~79g/m²) | 77g/m² | 100% |
| 6 | LTR | OHP | OHP(151~180g/m²) | 166g/m² | 100% |
| 7 | A4 | TAB PAPER 1 | TAB PAPER 1(151~180g/m²) | 160g/m² | 100% |
| 8 | A4 | OHP | OHP(151~180g/m²) | 166g/m² | 100% |
| 9 | B5 | THICK PAPER 2 | THICK PAPER 2(129~150g/m²) | 140g/m² | 100% |
| 10 | A3 | THICK PAPER 1 | THICK PAPER 1(106~128g/m²) | 117g/m² | 100% |

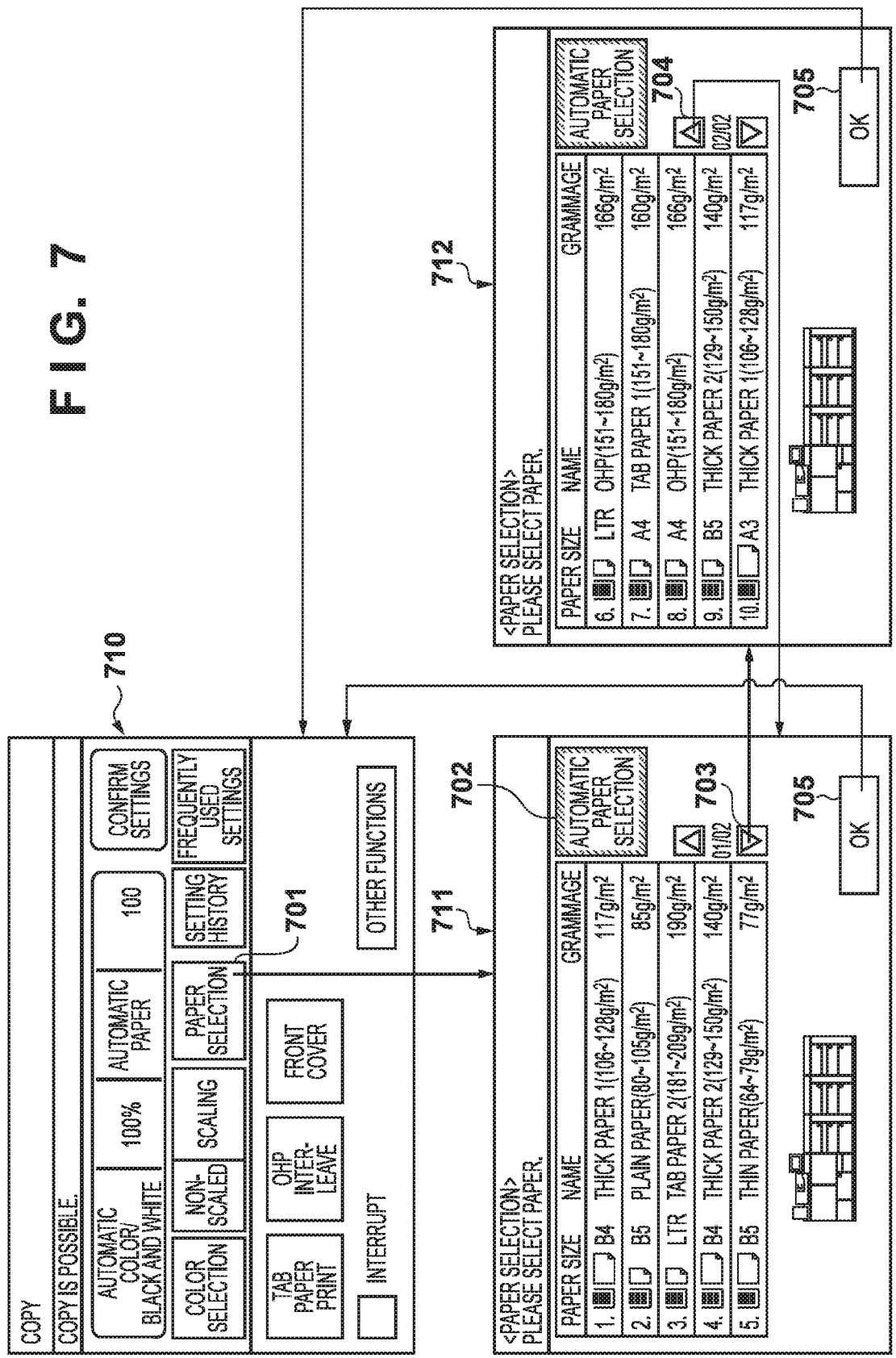

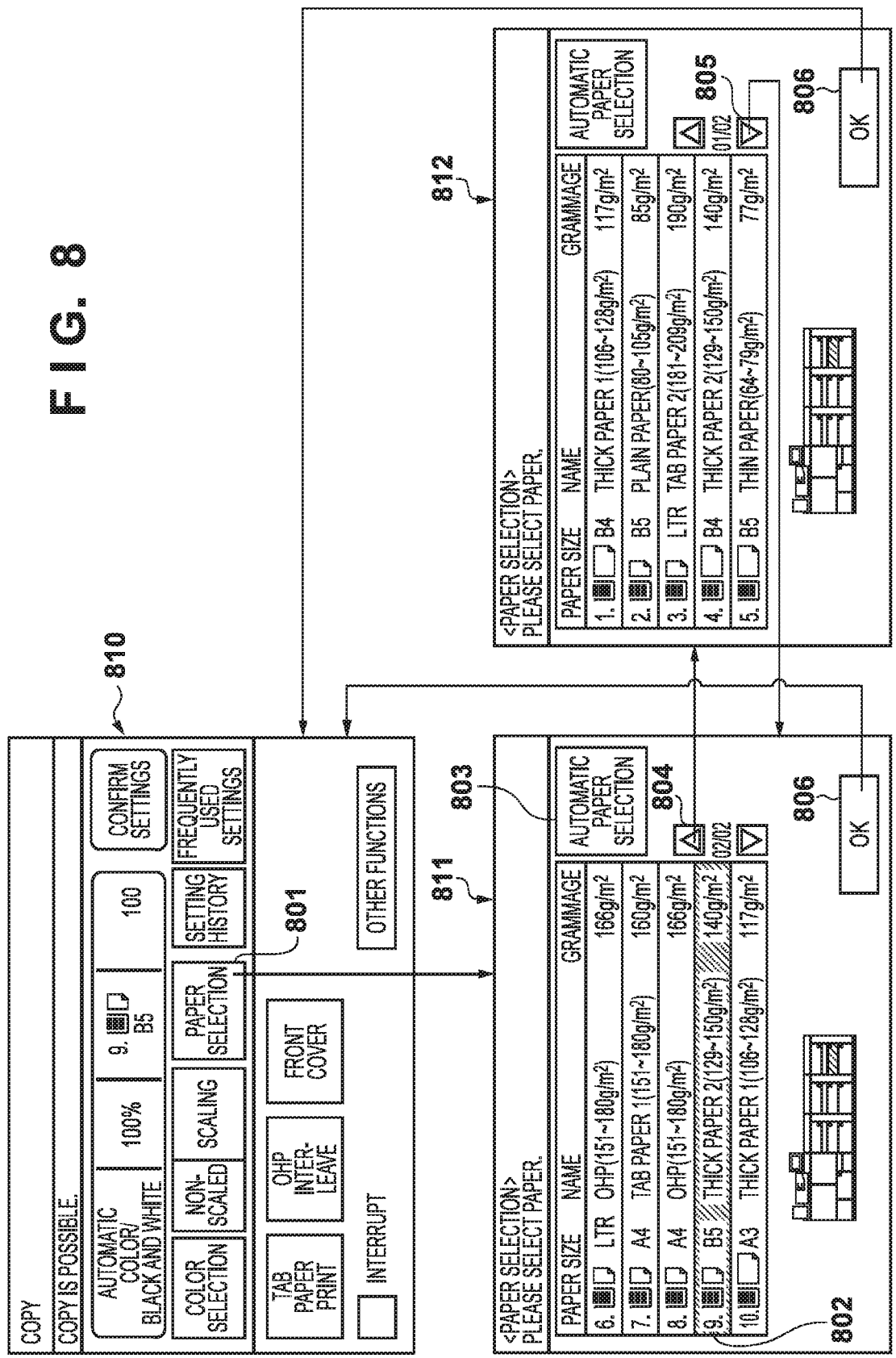

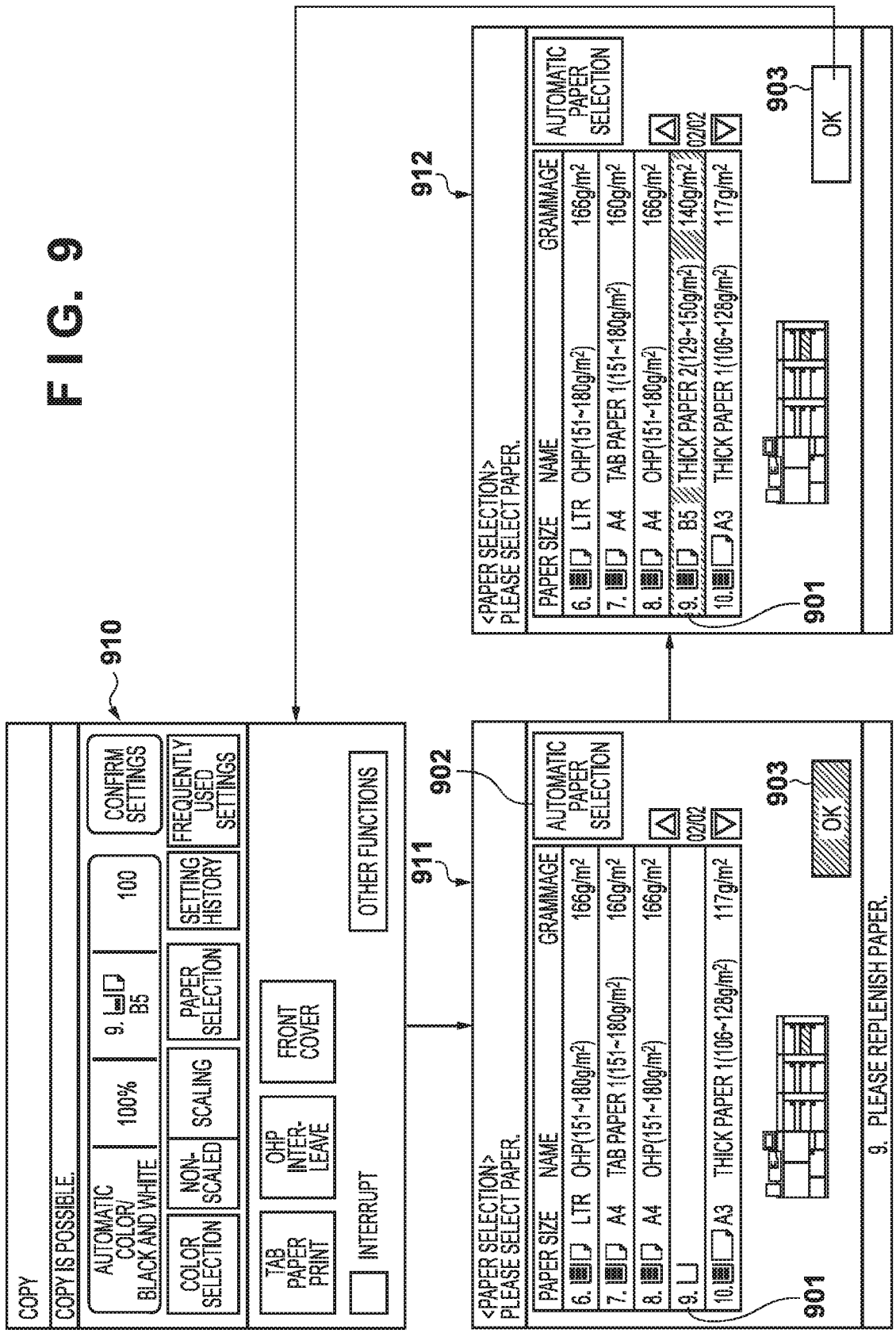

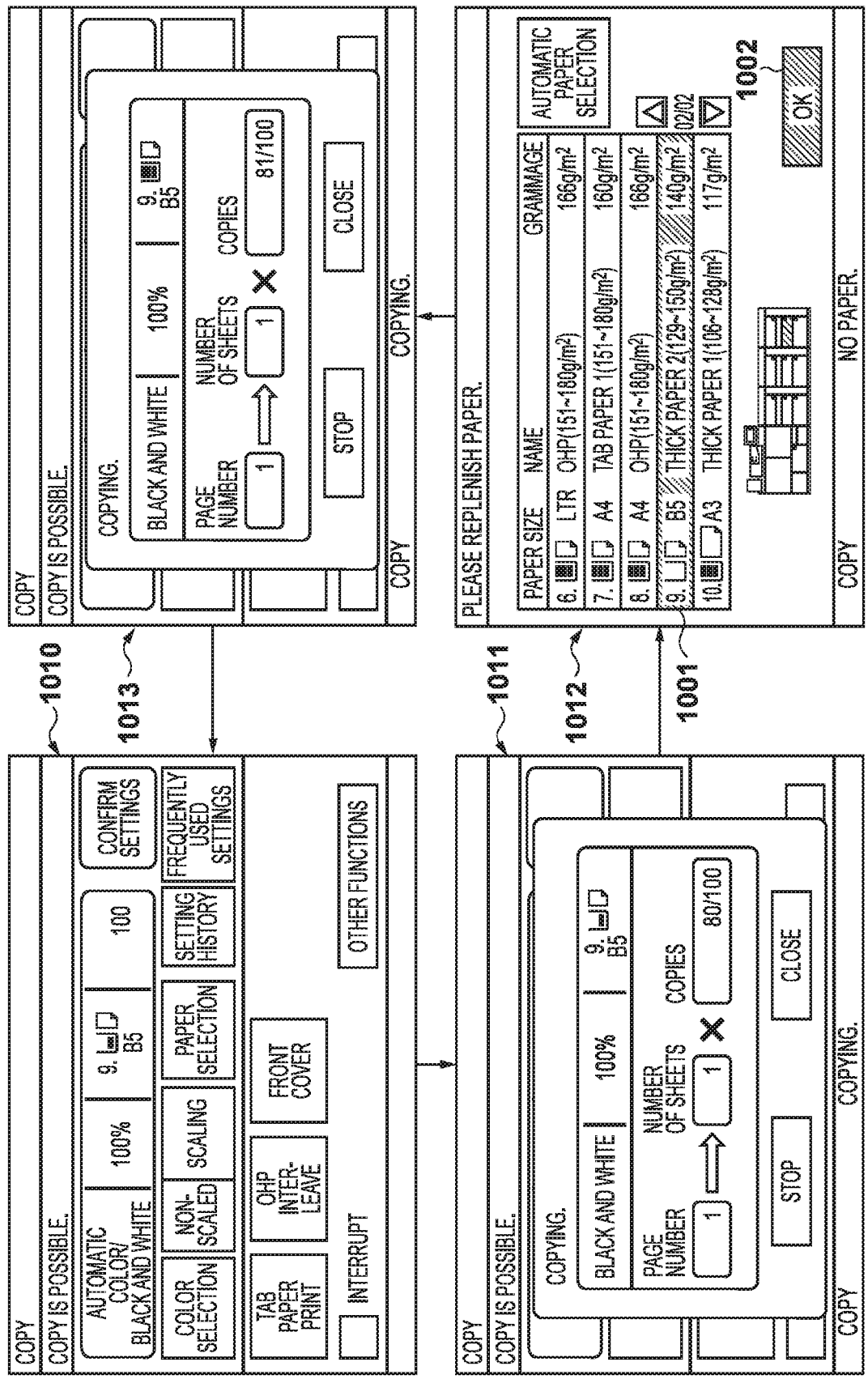

DISPLAY MANAGEMENT TABLE CONSIDERING
PAPER TYPE/SIZE RESTRICTIONS (eg. LTR/A4 TAB PAPER)

| DISPLAY PRECEDENCE | PAPER FEED DECK ID | PAPER SIZE | PAPER TYPE |
|---|---|---|---|
| 1 | 3 | LTR | TAB PAPER 2 |
| 2 | 7 | A4 | TAB PAPER 1 |
| 3 | 1 | B4 | THICK PAPER 1 |
| 4 | 2 | B5 | PLAIN PAPER |
| 5 | 4 | B4 | THICK PAPER 2 |
| 6 | 5 | B5 | THIN PAPER |
| 7 | 6 | LTR | OHP |
| 8 | 8 | A4 | OHP |
| 9 | 9 | B5 | THICK PAPER 2 |
| 10 | 10 | A3 | THICK PAPER 1 |

FIG. 18A

DISPLAY MANAGEMENT TABLE CONSIDERING
PAPER TYPE RESTRICTION (eg. THICK PAPER)

| DISPLAY PRECEDENCE | PAPER FEED DECK ID | PAPER SIZE | PAPER TYPE |
|---|---|---|---|
| 1 | 1 | B4 | THICK PAPER 1 |
| 2 | 4 | B4 | THICK PAPER 2 |
| 3 | 9 | B5 | THICK PAPER 2 |
| 4 | 10 | A3 | THICK PAPER 1 |
| 5 | 2 | B5 | PLAIN PAPER |
| 6 | 3 | LTR | TAB PAPER 2 |
| 7 | 5 | B5 | THIN PAPER |
| 8 | 6 | LTR | OHP |
| 9 | 7 | A4 | TAB PAPER 1 |
| 10 | 8 | A4 | OHP |

FIG. 18B

DISPLAY MANAGEMENT TABLE CONSIDERING
PAPER SIZE RESTRICTIONS (eg. LTR/A4)

| DISPLAY PRECEDENCE | PAPER FEED DECK ID | PAPER SIZE | PAPER TYPE |
|---|---|---|---|
| 1 | 3 | LTR | TAB PAPER 2 |
| 2 | 6 | LTR | OHP |
| 3 | 7 | A4 | TAB PAPER 1 |
| 4 | 8 | A4 | OHP |
| 5 | 1 | B4 | THICK PAPER 1 |
| 6 | 2 | B5 | PLAIN PAPER |
| 7 | 4 | B4 | THICK PAPER 2 |
| 8 | 5 | B5 | THIN PAPER |
| 9 | 9 | B5 | THICK PAPER 2 |
| 10 | 10 | A3 | THICK PAPER 1 |

FIG. 18C

INITIALIZED DISPLAY MANAGEMENT TABLE

| DISPLAY PRECEDENCE | PAPER FEED DECK ID | PAPER SIZE | PAPER TYPE |
|---|---|---|---|
| 1 | 1 | B4 | THICK PAPER 1 |
| 2 | 2 | B5 | PLAIN PAPER |
| 3 | 3 | LTR | TAB PAPER 2 |
| 4 | 4 | B4 | THICK PAPER 2 |
| 5 | 5 | B5 | THIN PAPER |
| 6 | 6 | LTR | OHP |
| 7 | 7 | A4 | TAB PAPER 1 |
| 8 | 8 | A4 | OHP |
| 9 | 9 | B5 | THICK PAPER 2 |
| 10 | 10 | A3 | THICK PAPER 1 |

FIG. 18D

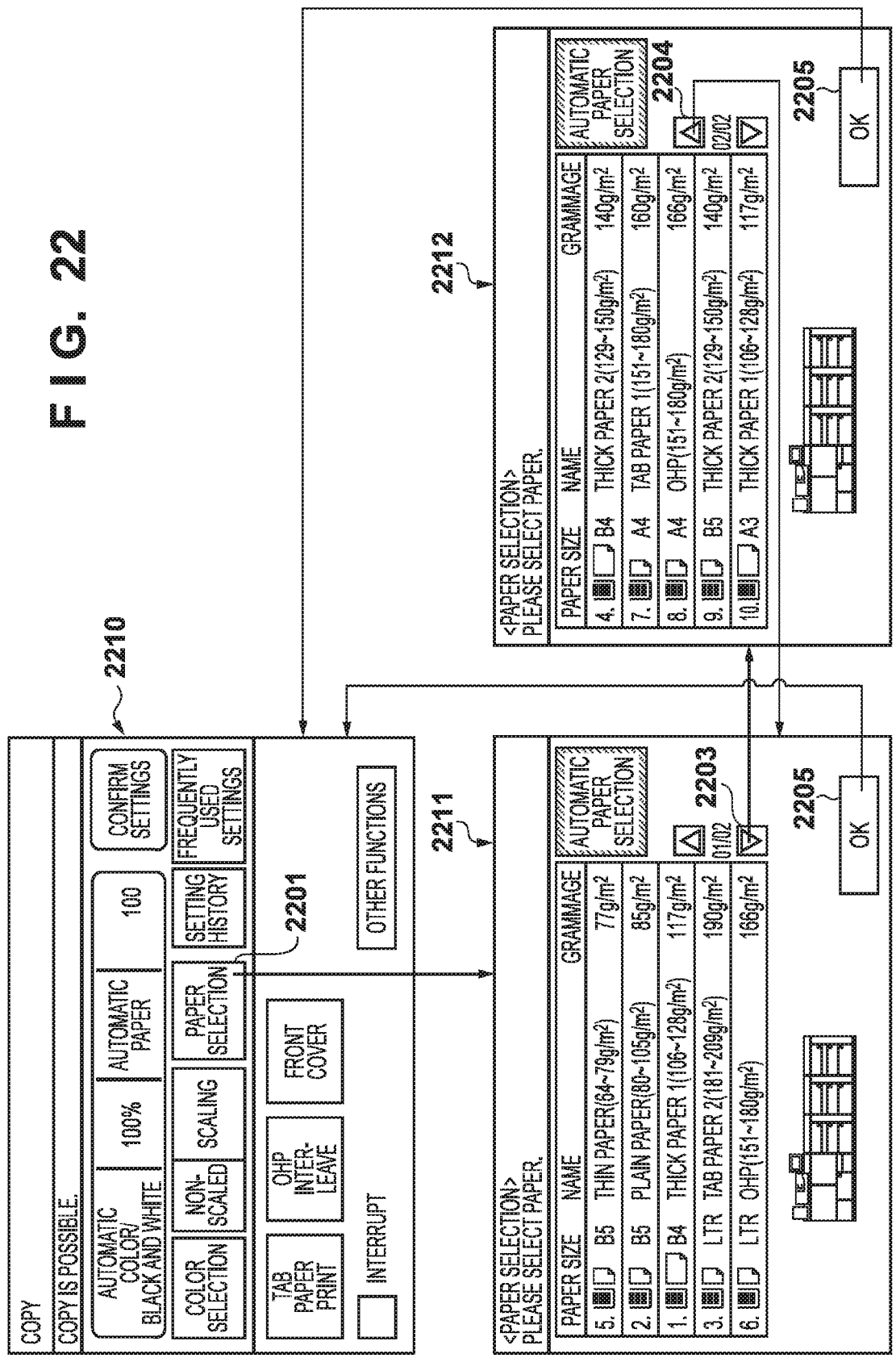

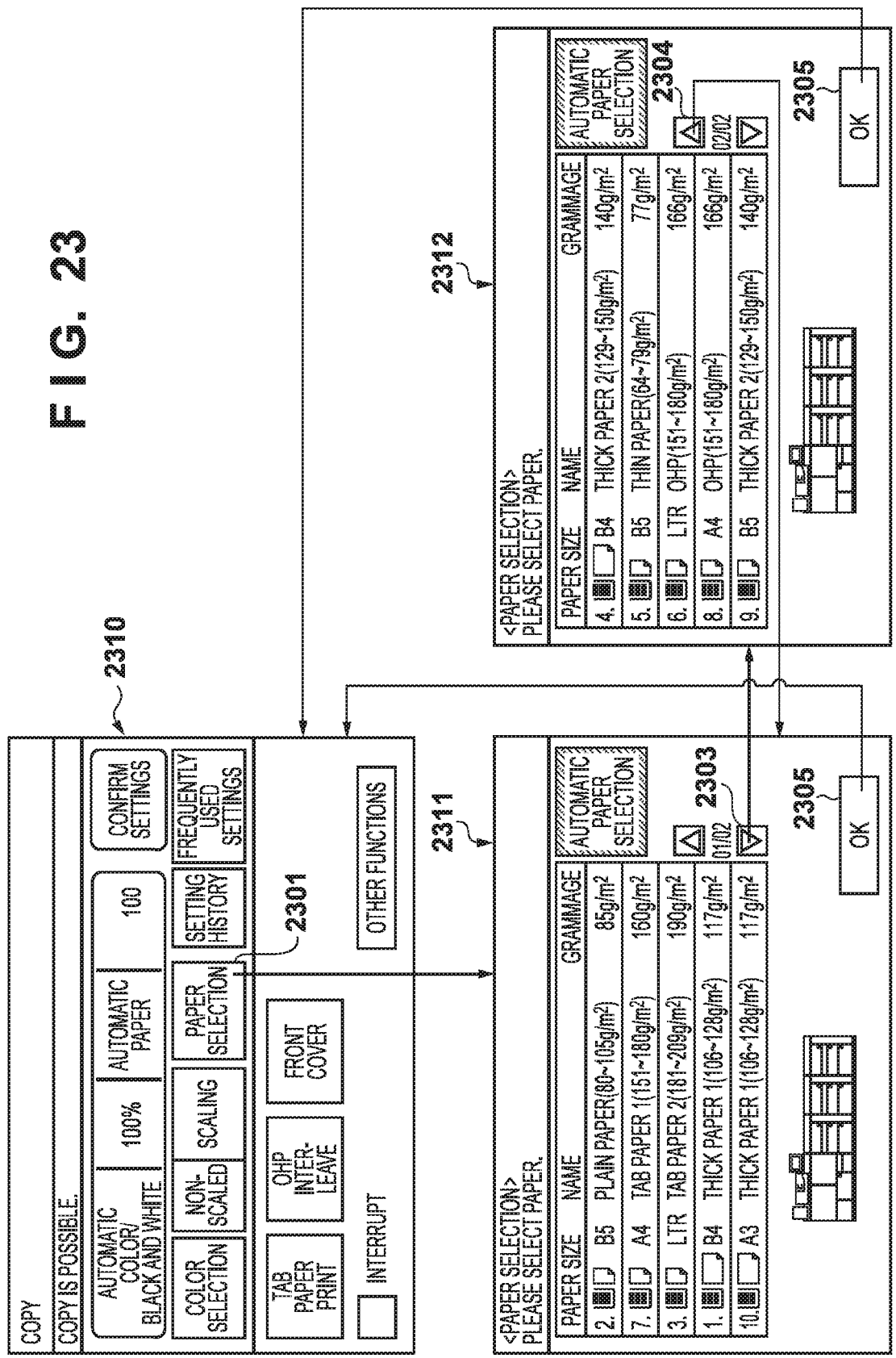

FIG. 25A

DISPLAY MANAGEMENT TABLE CONSIDERING PAPER TYPE GROUPS

| DISPLAY PRECEDENCE | PAPER FEED DECK ID | PAPER SIZE | PAPER TYPE |
|---|---|---|---|
| 1 | 5 | B5 | THIN PAPER |
| 2 | 2 | B5 | PLAIN PAPER |
| 3 | 1 | B4 | THICK PAPER 1 |
| 4 | 10 | A3 | THICK PAPER 1 |
| 5 | 4 | B4 | THICK PAPER 2 |
| 6 | 9 | B5 | THICK PAPER 2 |
| 7 | 7 | A4 | TAB PAPER 1 |
| 8 | 3 | LTR | TAB PAPER 2 |
| 9 | 6 | LTR | OHP |
| 10 | 8 | A4 | OHP |

FIG. 25B

DISPLAY MANAGEMENT TABLE CONSIDERING PAPER SIZE GROUPS

| DISPLAY PRECEDENCE | PAPER FEED DECK ID | PAPER SIZE | PAPER TYPE |
|---|---|---|---|
| 1 | 2 | B5 | PLAIN PAPER |
| 2 | 5 | B5 | THIN PAPER |
| 3 | 9 | B5 | THICK PAPER 2 |
| 4 | 7 | A4 | TAB PAPER 1 |
| 5 | 8 | A4 | OHP |
| 6 | 3 | LTR | TAB PAPER 2 |
| 7 | 6 | LTR | OHP |
| 8 | 1 | B4 | THICK PAPER 1 |
| 9 | 4 | B4 | THICK PAPER 2 |
| 10 | 10 | A3 | THICK PAPER 1 |

FIG. 25C

DISPLAY MANAGEMENT TABLE CONSIDERING
DIFFERENT PAPER TYPE GROUPS

| DISPLAY PRECEDENCE | PAPER FEED DECK ID | PAPER SIZE | PAPER TYPE |
|---|---|---|---|
| 1 | 5 | B5 | THIN PAPER |
| 2 | 2 | B5 | PLAIN PAPER |
| 3 | 1 | B4 | THICK PAPER 1 |
| 4 | 3 | LTR | TAB PAPER 2 |
| 5 | 6 | LTR | OHP |
| 6 | 4 | B4 | THICK PAPER 2 |
| 7 | 7 | A4 | TAB PAPER 1 |
| 8 | 8 | A4 | OHP |
| 9 | 9 | B5 | THICK PAPER 2 |
| 10 | 10 | A3 | THICK PAPER 1 |

FIG. 25D

DISPLAY MANAGEMENT TABLE CONSIDERING
DIFFERENT PAPER SIZE GROUPS

| DISPLAY PRECEDENCE | PAPER FEED DECK ID | PAPER SIZE | PAPER TYPE |
|---|---|---|---|
| 1 | 2 | B5 | PLAIN PAPER |
| 2 | 7 | A4 | TAB PAPER 1 |
| 3 | 3 | LTR | TAB PAPER 2 |
| 4 | 1 | B4 | THICK PAPER 1 |
| 5 | 10 | A3 | THICK PAPER 1 |
| 6 | 4 | B4 | THICK PAPER 2 |
| 7 | 5 | B5 | THIN PAPER |
| 8 | 6 | LTR | OHP |
| 9 | 8 | A4 | OHP |
| 10 | 9 | B5 | THICK PAPER 2 |

FIG. 25E

INITIALIZED DISPLAY MANAGEMENT TABLE

| DISPLAY PRECEDENCE | PAPER FEED DECK ID | PAPER SIZE | PAPER TYPE |
|---|---|---|---|
| 1 | 1 | B4 | THICK PAPER 1 |
| 2 | 2 | B5 | PLAIN PAPER |
| 3 | 3 | LTR | TAB PAPER 2 |
| 4 | 4 | B4 | THICK PAPER 2 |
| 5 | 5 | B5 | THIN PAPER |
| 6 | 6 | LTR | OHP |
| 7 | 7 | A4 | TAB PAPER 1 |
| 8 | 8 | A4 | OHP |
| 9 | 9 | B5 | THICK PAPER 2 |
| 10 | 10 | A3 | THICK PAPER 1 |

IMAGE FORMING APPARATUS THAT DISPLAYS A PAPER FEED UNIT SELECTION SCREEN

This application is a continuation of U.S. patent application Ser. No. 15/232,648, filed Aug. 9, 2016, which is a continuation of U.S. patent application Ser. No. 13/960,535, filed on Aug. 6, 2013, which issued as U.S. Pat. No. 9,432,537, and which claims the benefit of Japanese Patent Application No. 2012-188069, filed on Aug. 28, 2012, each of which is incorporated herein by reference in its entirety.

BACKGROUND OF THE INVENTION

Field of the Invention

The present invention relates to a technique for displaying information of paper contained in a plurality of feeding units and making selectable a feeding unit that a user uses for image forming.

Description of the Related Art

Conventionally, in image forming apparatuses, such as copy machines and printers, when printing is performed, in addition to function settings related to various image processing and post-processing on a printed piece of paper, a user is given the ability to select the paper on which to print. Also, for example, Japanese Patent Laid-open No. 2007-243313 proposes an image forming apparatus upon which selecting a paper type corresponding to a printing function setting from out of several hundred paper types indicating a paper quality of the paper, such as plain paper and thick paper, is made possible.

In the image forming apparatus described above, a paper selection screen, such as the one shown in FIG. 1, is displayed, and the user selects a target paper feed tray by making an instruction with an icon for a paper size, a paper type, or the like, shown on this screen.

Also, in business related to printing, such as in a Print On Demand (POD) environment, cases are expected in which a user uses a paper type acquired by customizing a name, a grammage, etcetera, of paper, rather than the user using a paper type pre-registered in the image forming apparatus.

In a case in which a target paper feed tray is selected from out of a plurality of paper feed trays based on detailed information about the paper, such as a paper size, a paper name, a grammage, or the like, it can be conceived that information about paper contained in the plurality of paper feed trays will be displayed in list format, as in FIG. 2, for example. There are cases, however, in which an image forming apparatus used in a POD environment comprises no less than ten types of paper feed trays, and so, with a screen, such as the one in FIG. 2, operation by the user, such as paging and scrolling, will be necessary in order to confirm all of the paper feed tray information. For this reason, problems, such as poor viewability of the display, and that selection of the paper feed tray is time consuming, exist.

SUMMARY OF THE INVENTION

An object of the present invention is to eliminate the above-mentioned problems with the conventional technology.

In this regard, the present invention provides a technique for improving usability and work efficiency when selecting what paper to use for printing out of paper stored in a plurality of feeding units.

According to one aspect, the present invention provides an image forming apparatus comprising a plurality of paper feed units, a display unit configured to display a paper selection screen for displaying a page of items of information of the paper feed units and selecting a paper to be used in print processing by selecting an item of the items of information in the page displayed on the paper selection screen, wherein items of information of the plurality of paper feed units are divided into a plurality of pages, and a control unit configured to control the display unit to display a page among the plurality of pages in accordance with a status of the image forming apparatus in a case in which the display unit displays the paper selection screen.

Further features of the present invention will become apparent from the following description of exemplary embodiments with reference to the attached drawings.

BRIEF DESCRIPTION OF THE DRAWINGS

The accompanying drawings are incorporated in and constitute a part of the specification, illustrate embodiments of the invention, and, together with the description, serve to explain the principles of the invention.

FIG. 6 depicts a view for illustrating an example of a paper feed deck management table for managing paper stored in paper feed decks 306 through 315 according to the first embodiment.

FIG. 7 depicts a view for illustrating an example of screen transition of a paper selection screen displayed in a case in which a "paper selection" key is pressed in an automatic paper selection mode according to the first embodiment.

FIG. 8 depicts a view for illustrating an example of screen transition of a paper selection screen displayed in a case in which a "paper selection" key is pressed in a paper feed deck designation mode according to the first embodiment.

FIG. 9 depicts a view for illustrating an example of screen transition of a paper selection screen displayed in a case in which a paper feed deck is pulled out in a paper feed deck designation mode according to the first embodiment.

FIG. 10 depicts a view for illustrating an example of screen transition of a paper selection screen displayed in a case in which paper runs out during printing in the first embodiment.

FIGS. 18A through 18D depict views for illustrating examples of display management tables according to the second embodiment.

FIG. 22 depicts a view for illustrating an example of screen transition of a paper selection screen in a case in which a "display by paper type group" mode is set according to the third embodiment.

FIG. 23 depicts a view for illustrating an example of screen transition of a paper selection screen in a case in which a "consider other paper sizes" mode is set according to the third embodiment.

FIGS. 25A through 25E are views for illustrating examples of display management tables according to the third embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 3:
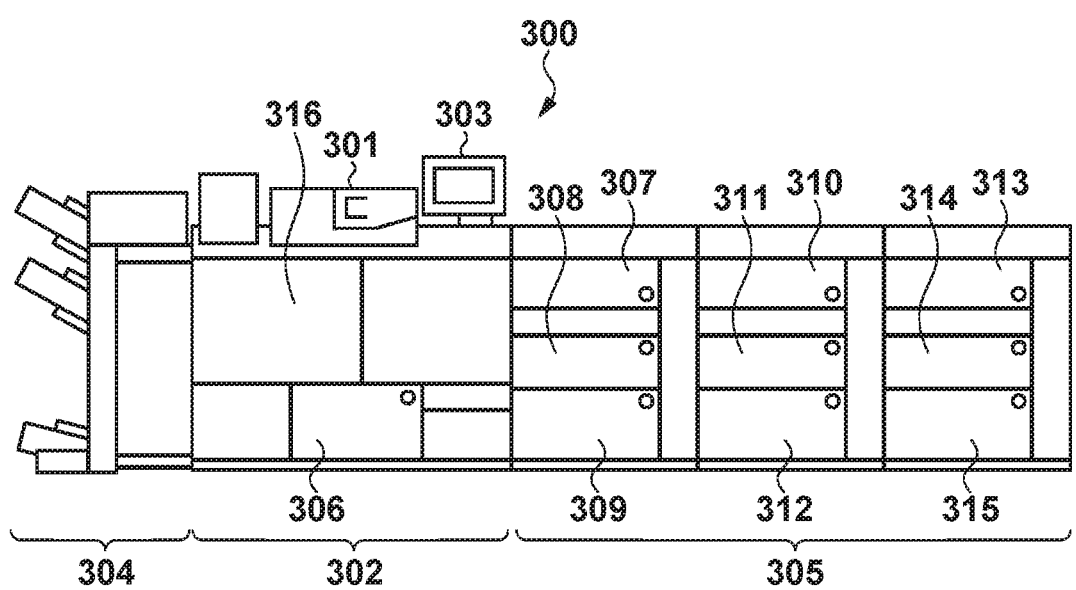
FIG. 3 depicts a view for showing an overall configuration of an image forming system according to a first embodiment.

FIG. 3 depicts a view for showing an overall configuration of an image forming system 300 according to a first embodiment.

In FIG. 3, the image forming system 300 comprises an image forming apparatus 302 that includes a scanner 301 that is an image input device, a printer 316 that is an image output device and a console unit 303, a finisher 304 and a paper feed accessory 305. Note, with this drawing, an example is shown in which paper feed decks (feeding units) 306 through 315 are arranged in the image forming system 300, but the invention is not limited to this number of decks.

Figure 4:
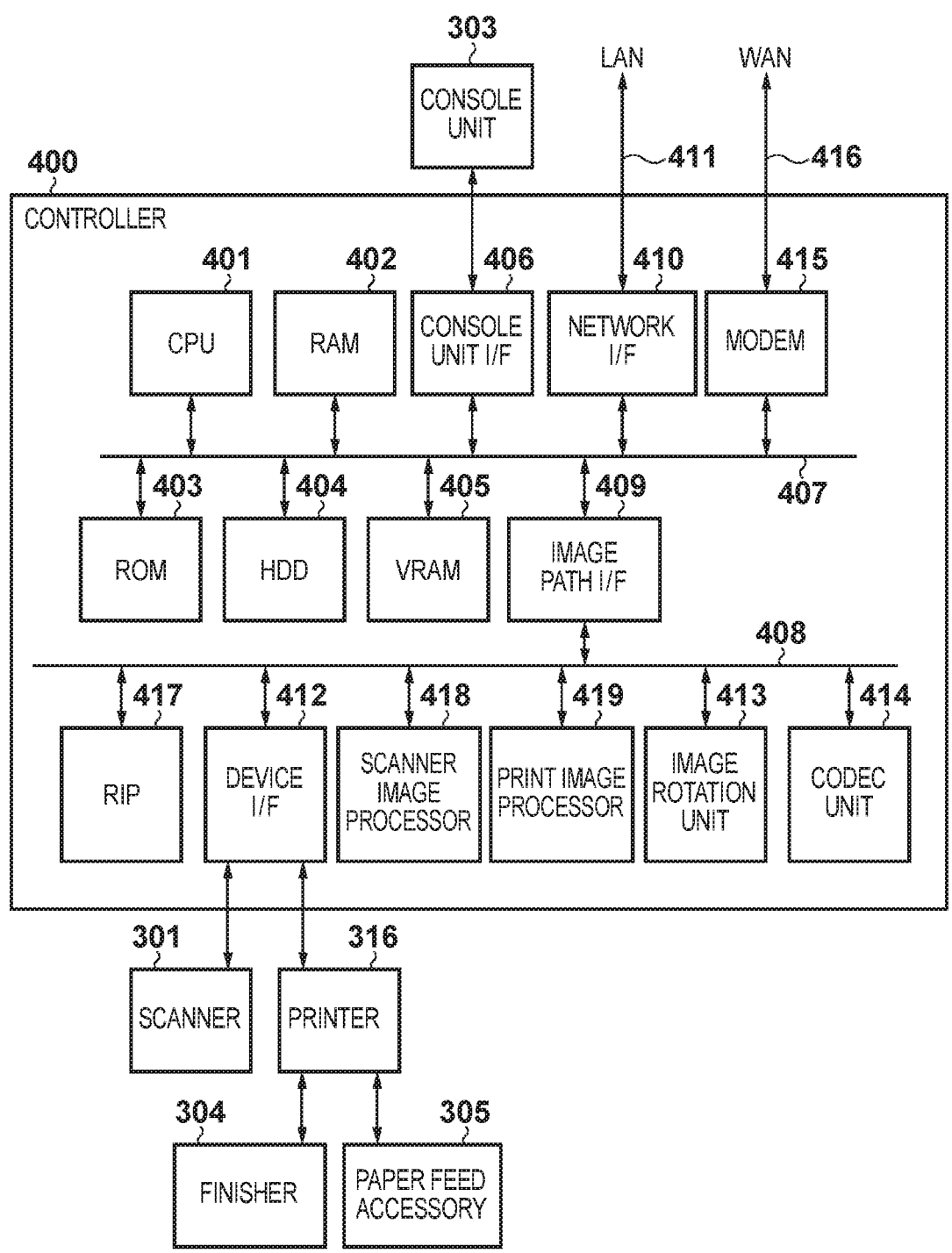
FIG. 4 is a block diagram for showing a configuration of an image forming apparatus that is a main unit of the image forming system according to the first embodiment.

FIG. 4 is a block diagram for showing a configuration of the image forming apparatus 302 that is a main unit of the image forming system 300 according to the first embodiment. The image forming apparatus 302 includes the scanner 301, the printer 316 and the console unit 303 of FIG. 3, and is controlled by a controller 400. Note, in FIG. 4, portions common to FIG. 3 are shown with the same reference numbers.

The controller 400 performs input and output of image information, device information, and the like, by connecting to the scanner 301 and to the printer 316 and, on one side, connecting to a local area network (LAN) 411 and to a public network (wide area network (WAN)) 416.

In the controller 400, a central processing unit (CPU) 401 controls the image forming apparatus 302 as a whole, and performs control for causing each of types of selection screens to be displayed, described below, to the console unit 303. Also, the CPU 401 executes processing for displaying a flowchart, described below, based on a program loaded into a random access memory (RAM) 402 from a hard disk drive (HDD) 404. The RAM 402 is a system work memory for operation of the CPU 401, and it is also an image memory for temporarily storing image data. Also, function settings for paper feed trays, printing, and image processing set from the console unit 303 (settings for tab paper printing, OHP interleave, front cover, etc.), information of a display management table, and the like, described below, are also stored in the RAM 402. A read-only memory (ROM) 403 is a boot ROM that stores a system boot program. The HDD 404 stores system software, image data, and various types of information. Also, information of a paper feed deck management table, a default display method for a paper selection screen, and the like, described below, are also stored in the HDD 404. When power is turned on, an operating system (OS) installed on the HDD 404, programs, and the like, are loaded into the RAM 402 by a boot program in the ROM 403, and control processing by the CPU 401 becomes possible.

A video random access memory (VRAM) 405 stores image data generated by the CPU 401 and to be displayed on a screen of the console unit 303, described below. A console unit interface (I/F) 406 controls an interface between the CPU 401 and the console unit 303, and outputs image data stored in the VRAM 405 to the console unit 303. Also, the console unit I/F 406 has a role of transferring information input by a user from the console unit 303 to the CPU 401. A network I/F 410 performs information input and output by connecting to the LAN 411. A modem 415 is connected to the public network 416, and performs information input and output with the public network 416. An image path I/F 409 is a bus bridge for converting data structures, and connects a system bus 407 and an image bus 408. The devices explained above are connected to the system bus 407.

The image bus 408 is a bus that transfers image data at high speed and may be a peripheral component interconnect (PCI) bus, an IEEE1394 (published by the Institute of Electrical and Electronics Engineers (IEEE), of Piscataway, N.J., United States) bus, or the like. The image bus 408 is arranged as follows. A raster image processing (RIP) 417 extracts a bitmap image from page description language (PDL) code. A device I/F 412 connects the controller 400, the scanner 301, and the printer 316, and performs both synchronous and asynchronous image data conversion. A scanner image processor 418 performs correction, processing, editing, and the like, on image data input from the scanner 301. A print image processor 419 performs correction, resolution conversion, and the like, on image data to be output to the printer 316. An image rotation unit 413 performs rotation of image data. A codec unit 414 performs Joint Photographic Expert Group (JPEG) compression/decompression processing on multi-valued image data. Also, the codec unit 414 performs Joint Bi-Level Image Experts Group (JBIG), Modified Modified Read (MMR), and Modified Huffman (MH) compression/decompression processing on binary image data.

The scanner 301 is an image input device that reads from an original and outputs to the controller 400 image data. The printer 316 is an image output device that prints an image onto paper under the control of the controller 400. Also, the printer 316 comprises the paper feed deck 306 (FIG. 3) and performs processing for printing onto paper fed from the paper feed deck 306. Furthermore, the printer 316 is connected by circuitry to the finisher 304 and to the paper feed accessory 305. The finisher 304 performs post-processing, such as sorting and stapling, on a printed piece of paper conveyed from the printer 316. The paper feed accessory 305 comprises paper feed decks 307 through 315, as shown in FIG. 3, and performs processing for conveying paper to the printer 316 from a selected one of the paper feed decks 307 through 315.

Figure 5:
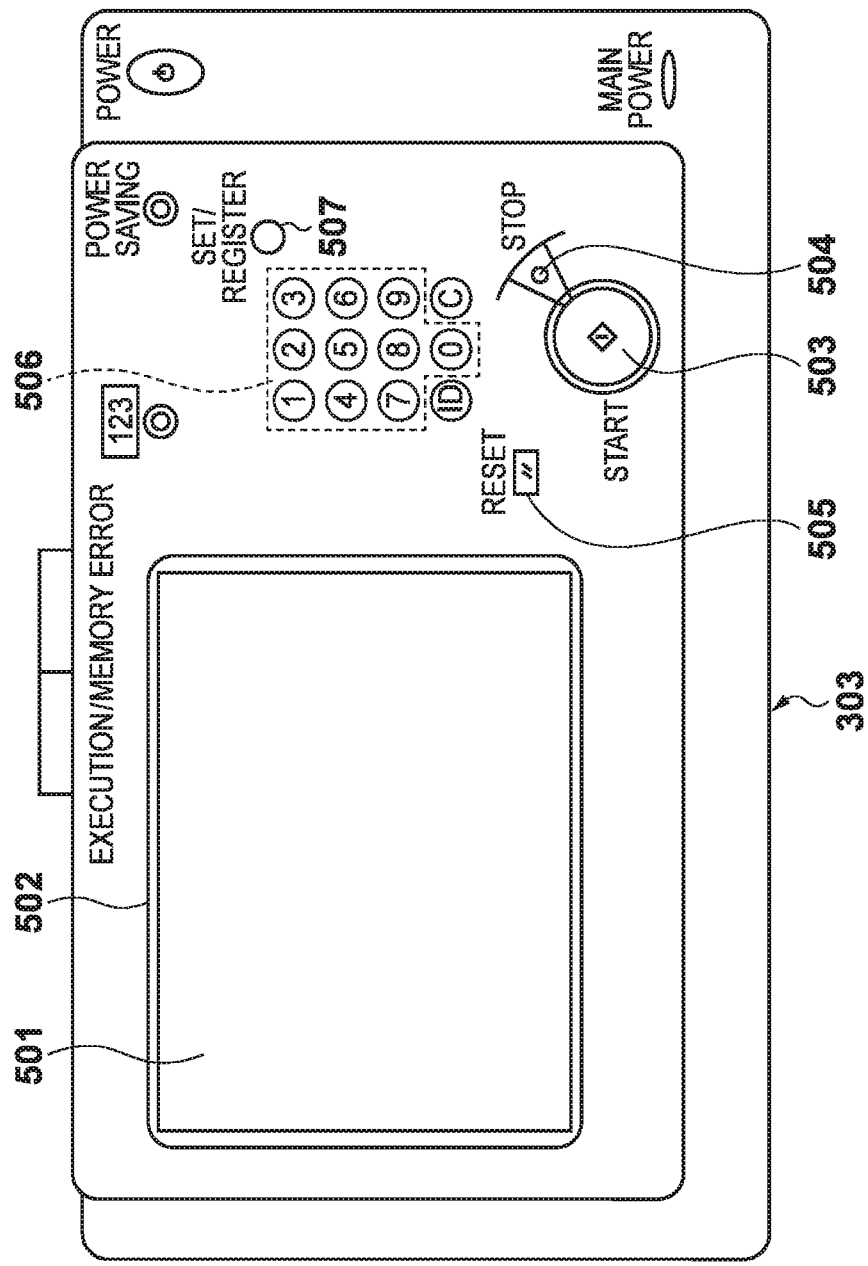
FIG. 5 depicts a view for showing a configuration of the console unit of the image forming apparatus according to the first embodiment.

FIG. 5 depicts a view for showing a configuration of the console unit 303 of the image forming apparatus 302 according to the first embodiment.

In FIG. 5, the console unit 303 comprises a display unit 502 having a front surface on which a touch panel sheet 501 is attached, a start key 503 that is a hardware key, a stop key 504, a reset key 505, a numeric keypad 506, and a setting/registration key 507. On the display unit 502, each of the screens, the softkeys, and the like, described below, are displayed under the control of the CPU 401 of the controller 400.

When the display part of a softkey displayed on the display unit 502 is pressed by the user, position information is transmitted to the CPU 401. In this description, the process in which the user designating the softkey via the touch panel sheet 501 and the CPU 401 determining that the softkey is pressed will be called softkey pressing. The start key 503 is used to cause the operation of reading an original to start. The stop key 504 is used to stop an operation in the middle of execution. The reset key 505 is used when initializing settings of the console unit 303. The numeric keypad 506 is used when performing input of numbers. The setting/registration key 507 is used when displaying a later described setting/registration screen.

FIG. 6 depicts a view for illustrating an example of a paper feed deck management table for managing paper stored in paper feed decks 306 through 315 according to the first embodiment.

In FIG. 6, in the paper feed deck management table, paper feed deck information, such as a paper feed deck ID, a paper size, a paper type, a name, a grammage, and a remaining paper amount, is registered. The paper feed deck identification (ID) is an ID for managing paper feed decks that identifies the paper feed decks 306 through 315 and is from "1" through "10" for paper feed decks 306 through 315. The paper size is information indicating a size of paper that is paper fed from the paper feed deck indicated by the paper feed deck ID, and a paper size detected by a sensor in each paper feed deck is registered. The paper type is information indicating a type of paper that is paper fed from the paper feed deck indicated by the paper feed deck ID, and, when printing onto paper that is fed from a paper feed deck is performed, the printing is performed under conditions in accordance with print control parameters of the paper type (type of paper) corresponding to the paper feed deck ID. The name is information indicating the name of paper that is fed from the paper feed deck indicated by the paper feed deck ID, and any character string can be registered so as to be easily discriminable by a user. The grammage is information indicating the grammage of paper that is fed from the paper feed deck indicated by the paper feed deck ID, and, based on this grammage, the user changes a fixing condition of the paper. The remaining paper amount is information indicating the remaining amount of paper stored in the paper feed deck indicated by the paper feed deck ID, and the remaining paper amount detected for a corresponding paper feed deck is registered in the paper feed deck management table. In this way, the paper feed deck management table stores information of the paper stored in the paper feed decks, and associates this with information of the paper feed decks.

Next, an explanation will be given for screens displayed on the display unit 502 of the console unit 303 of the image forming apparatus 302 according to the first embodiment with reference to FIGS. 7 through 11.

FIG. 7 depicts a view for illustrating an example of screen transition of a paper selection screen displayed in a case in which a "paper selection" key 701 is pressed in an automatic paper selection mode according to the first embodiment.

At a copy base screen 710, an automatic paper selection mode in which a paper feed deck is not designated is set in a copy main screen (also referred to as the copy base screen). When the CPU 401 detects that a "paper selection" key 701 is pressed in this state, it displays a paper selection screen 711 (first page).

In the paper selection screen 711, in the order of the paper feed deck IDs "1" through "5" of FIG. 6, the paper feed deck ID, a remaining paper amount icon, a paper orientation icon, a paper size, a name, and a grammage, stored in the paper feed deck management table, are displayed as a list. Also, because the paper selection screen 711 displays that the automatic paper selection mode is set, an "automatic paper selection" key 702 is invertedly displayed.

Note, in the paper selection screen 711, selection of the paper feed deck is performed by pressing a line in which a paper feed deck is displayed. Also, a user cancels automatic paper selection mode and returns to the copy base screen 710 by pressing an "OK" key 705 in the bottom right of the screen after having selected the paper feed deck.

When the CPU 401 detects that a page forward key 703 is pressed in the paper selection screen 711, it displays a paper selection screen 712 (second page). In the paper selection screen 712, in the order of the paper feed deck IDs "6" through "10" of FIG. 6, the detailed information of the paper feed decks registered in the paper feed deck management table is displayed as a list. Also, when the CPU 401 detects that a page back key 704 is pressed in the paper selection screen 712, the paper selection screen 711 (first page), described above, is displayed. Also, when the CPU 401 detects that the "OK" key 705 is pressed in the paper selection screens 711 or 712, it closes the paper selection screen 711 or 712 and returns to the copy base screen 710. By performing this kind of display control, printing can be performed using the paper feed deck containing the paper that the user desires.

FIG. 8 depicts a view for illustrating an example of screen transition of the paper selection screen displayed in a case in which a "paper selection" key 801 is pressed in a paper feed deck designation mode according to the first embodiment.

At a copy base screen 810 of FIG. 8, a mode in which paper feeding from the paper feed deck 314 having paper feed deck ID "9" is designated is set. When the CPU 401 detects that a "paper selection" key 801 is pressed in the copy base screen 810, it calculates a number of display pages of the paper selection screen and displays a paper selection screen 811 of FIG. 8 (second page). In other words, because the paper feed deck 314 having paper feed deck ID "9" is selected, the second page paper selection screen 811, corresponding to the paper selection screen 712 of FIG. 7, including paper feed deck information of paper feed deck 314, is displayed.

Also, because the paper selection screen 811 displays that the mode in which the paper feed deck 314 having paper feed deck ID "9" is designated is set, a line 802 corresponding to paper feed deck ID "9" is invertedly displayed.

It is possible for the user to cancel paper feed deck designation mode and to switch to automatic paper selection mode by pressing an "OK" key 806 at the bottom right of the screen after pressing an "automatic paper selection" key 803 at the top right of the screen in the paper selection screen 811. Also, when the CPU 401 detects that the page back key 804 is pressed in the paper selection screen 811, it displays a first page paper selection screen 812. Furthermore, when the CPU 401 detects that a page forward key 805 is pressed in the paper selection screen 812, it displays the paper selection screen 811 (second page). Also, when the CPU 401 detects that the "OK" key 806 is pressed in the paper selection screen 811 or 812, it closes the paper selection screen and returns to the copy base screen 810.

FIG. 9 depicts a view for illustrating an example of screen transition of the paper selection screen displayed in a case in which a paper feed deck is pulled out in a paper feed deck designation mode according to the first embodiment.

At a copy base screen 910 of FIG. 9, a mode in which paper feeding from the paper feed deck 314 having paper feed deck ID "9" is designated is set. When the CPU 401 detects that a paper feed deck designated by the paper feed deck designation mode is pulled out in a state in which the copy base screen 910 is displayed, it calculates a number of display pages of the paper selection screen and displays a paper selection screen 911.

Because the paper feed deck 314 having paper feed deck ID "9" is pulled out in paper selection screen 911, the paper selection screen (second page) is displayed, and in a line 901 corresponding to the paper feed deck ID "9", only the paper feed deck ID and a remaining paper amount icon are displayed. Also, in the paper selection screen 911, in a state in which an "automatic paper selection" key 902 or a paper feed deck is not selected, an "OK" key 903 is displayed in hatching and operation on the "OK" key 903 is not accepted so that the paper selection screen cannot be closed.

When the CPU 401 detects that the paper feed deck 314 is mounted in a state in which the paper selection screen 911 is displayed, paper feed deck information of the line 901, which corresponds to the paper feed deck ID "9", is displayed and the line is invertedly displayed as in a paper selection screen 912. When the CPU 401 detects that the "OK" key 903 is pressed in the paper selection screen 912, it closes the paper selection screen 912 in a state in which the paper feed deck having paper feed deck ID "9" is selected, and returns to the copy base screen 910. In the paper selection screen 912, it can be seen that the amount of paper in the paper feed deck 314 having paper feed deck ID "9" has increased from when the copy base screen 910 is displayed.

FIG. 10 depicts a view for illustrating an example of screen transition of the paper selection screen displayed in a case in which paper runs out during printing in the first embodiment.

In a copy base screen 1010, a mode in which paper feeding is designated to be from the paper feed deck 314 having the paper feed deck ID "9" is set. When the CPU 401 detects that the start key 503 of the console unit 303 is pressed in this state, it starts print processing and displays a currently executing dialogue as shown in a screen 1011.

In a case in which an out of paper error occurred here during printing, the CPU 401 determines the paper feed deck that ran out of paper, calculates the number of display pages of the paper selection screen, and displays the paper selection screen 1012. Because in the paper selection screen 1012, paper ran out in paper feed deck 314 having paper feed deck ID "9", the second page paper selection screen including paper feed deck information of the paper feed deck 314 is displayed, a line 1001 corresponding to the paper feed deck "9" is displayed, and an icon indicating that paper has run out is displayed in the line 1001. Also, in the paper selection screen 1012, so that print processing cannot be restarted in a state in which the paper feed deck that ran out of paper is selected, by the "OK" key 1002 being displayed in hatching, it is shown that the "OK" key 1002 does not accept operation.

When the CPU 401 detects that the paper feed deck 314 has been replenished with paper in a state in which the paper selection screen 1012 is displayed, it closes the paper selection screen 1012 and displays a currently executing dialogue, as shown in a screen 1013. When the CPU 401 detects that print processing completed in the screen 1013, it closes the currently executing dialogue and returns to the copy base screen 1010.

Figure 11:
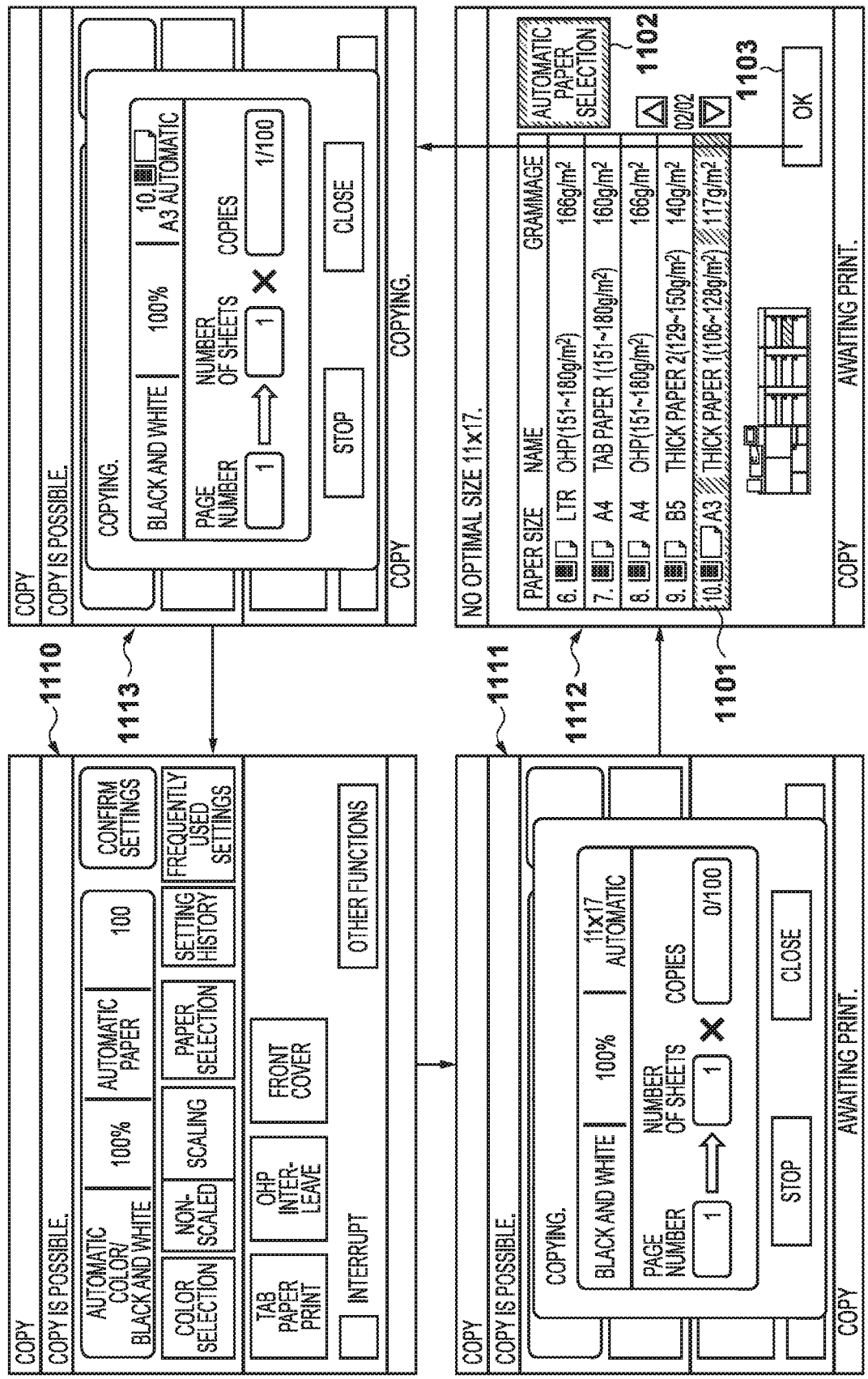
FIG. 11 depicts a view for illustrating an example of screen transition of a paper selection screen displayed in a case in which optimal paper runs out during printing in the first embodiment.

FIG. 11 depicts a view for illustrating an example of screen transition of the paper selection screen displayed in a case in which optimal paper runs out during printing in the first embodiment.

In a copy base screen 1110, the automatic paper selection mode in which a paper feed deck is not designated is set. When the CPU 401 detects that the start key 503 of the console unit 303 is pressed in this state, print processing is started and a currently executing dialogue is displayed as shown in a screen 1111.

In a case in which, during printing, an optimal paper run out error occurs here, the CPU 401 specifies a second candidate paper feed deck, calculates a number of display pages of the paper selection screen, and displays a paper selection screen 1112. In the paper selection screen 1112, the paper feed deck 315 having the paper feed deck ID "10" is selected as the second candidate paper feed deck with which recovery from the error is possible. Thus, a second page paper selection screen including paper feed deck information of the paper feed deck 315 is displayed, and a line 1101 corresponding to the paper feed deck ID "10" and an "automatic paper selection" key 1102 are invertedly displayed. When the CPU 401 detects that an "OK" button 1103 is pressed in this state, it closes the paper selection screen 1112 and displays a print processing using A3 size and thickness 1 of the paper feed deck ID "10" currently executing dialogue, as shown in a screen 1113. When the CPU 401 detects that print processing completed in the state of the screen 1113, it closes the currently executing dialogue and returns to the copy base screen 1110.

Next, explanation for characteristic processing procedure in the image forming apparatus 302 of the first embodiment is given referring to the flowcharts of FIGS. 12A and 12B and FIGS. 13A and 13B.

Figure 12A:
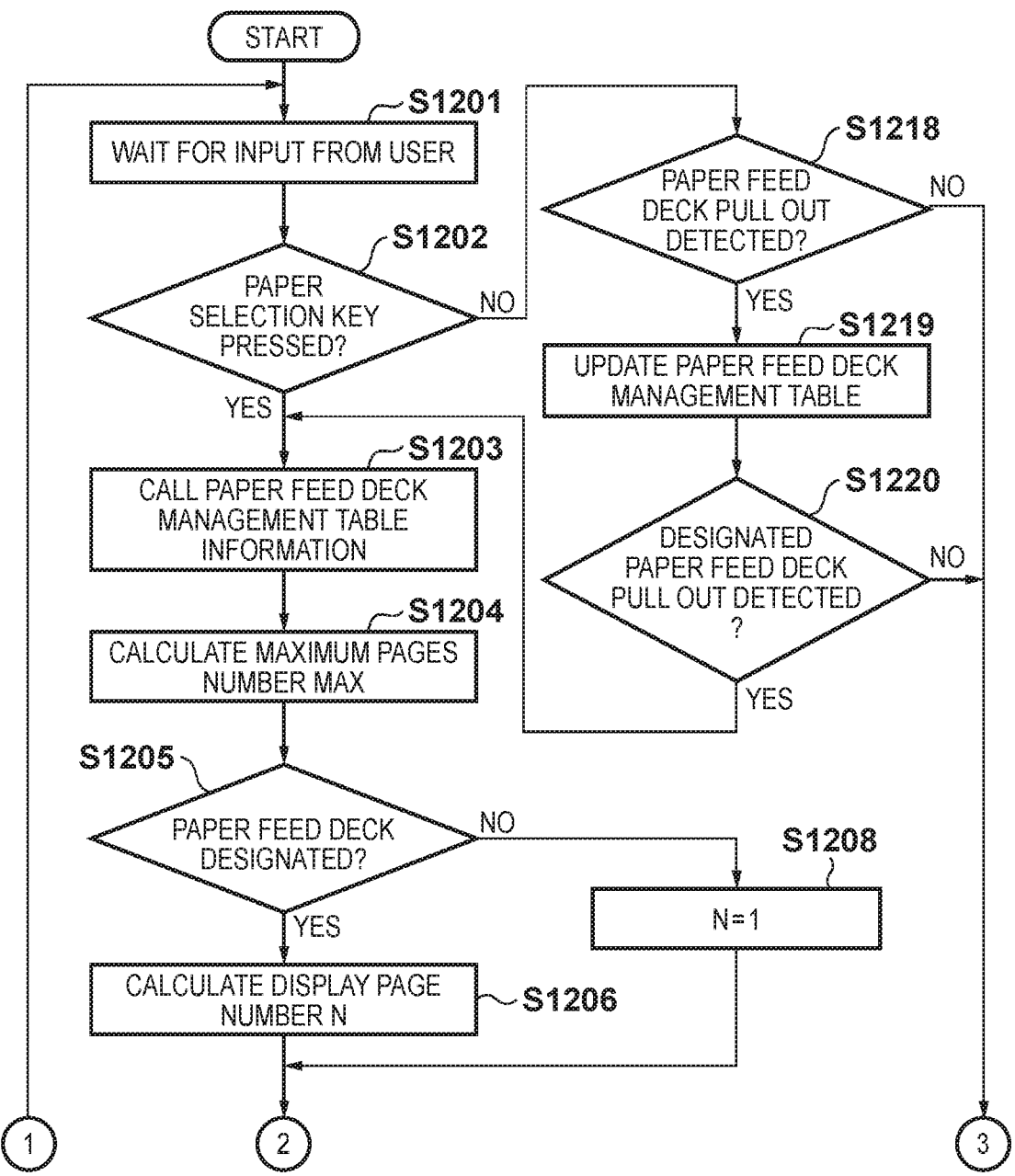
FIGS. 12A and 12B are flowcharts for describing a copy processing procedure in the image forming apparatus according to the first embodiment.
Figure 12B:
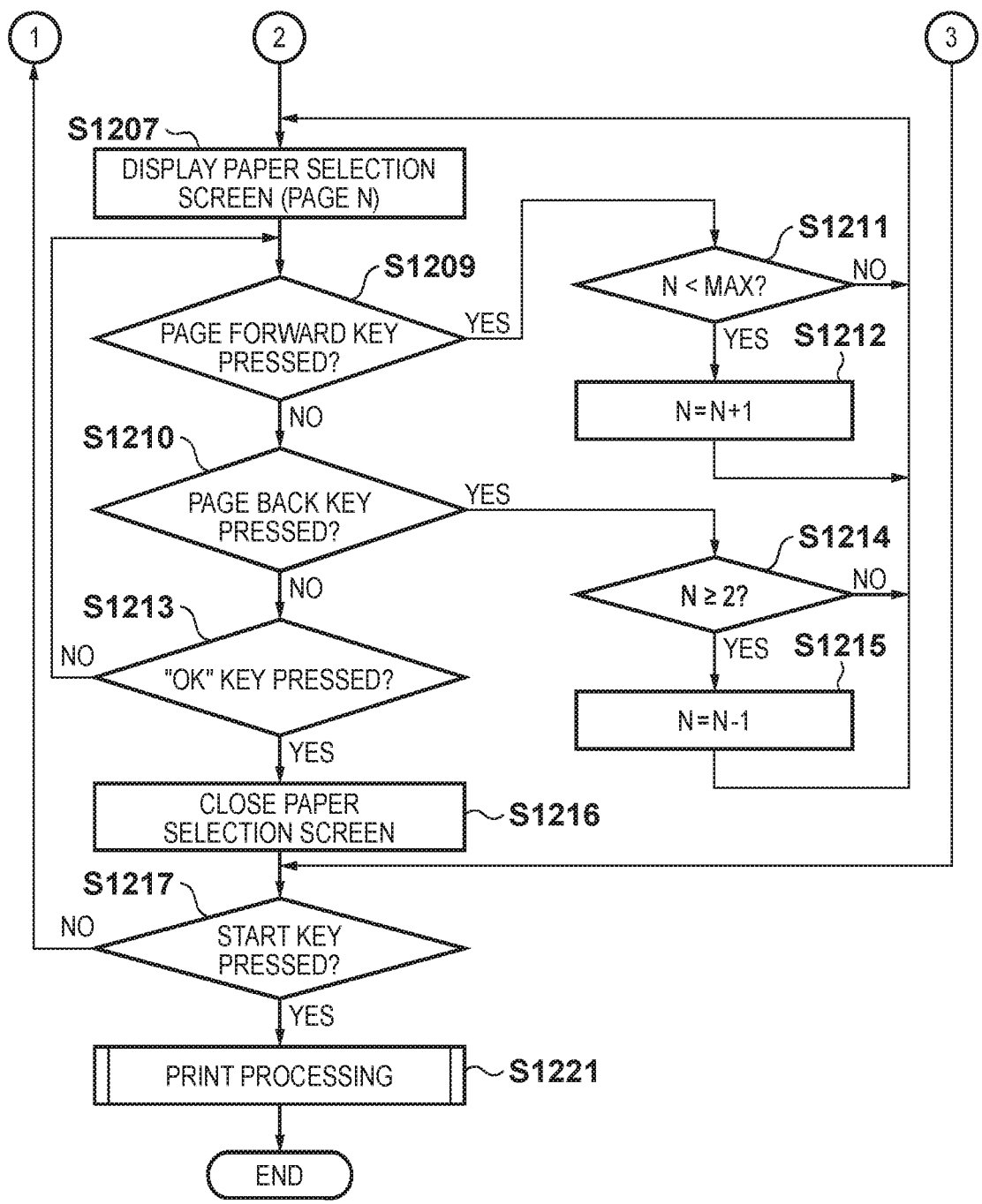

FIGS. 12A and 12B are flowcharts for describing a copy processing procedure in the image forming apparatus 302 according to the first embodiment. A program for executing this processing procedure is stored in the ROM 403 or the HDD 404 of the controller 400 and is executed when needed by the CPU 401. With FIGS. 12A and 12B, explanation will be given focusing on display for the paper selection screen up until print processing starts.

In FIG. 12A, firstly in step S1201, the CPU 401 displays the copy base screen to the display unit 502 of the console unit 303, and transitions to a state of waiting for input from a user. In a case in which the user performs an input operation on the console unit 303 via the copy base screen, the processing proceeds to step S1202 and the CPU 401 determines whether or not the "paper selection" key is pressed. When the "paper selection" key is pressed, the processing proceeds to step S1203 and the paper selection screen denoted by numeral 711 in FIG. 7 or by numeral 811 in FIG. 8 is displayed. On the other hand, in a case in which it is determined in step S1202 that the "paper selection" key is not pressed, the processing proceeds to step S1218, and the CPU 401 determines whether or not a pulling out of a paper feed deck is detected. In a case in which it is determined in step S1218 that a pulling out of a paper feed deck is detected, the processing proceeds to step S1219, the CPU 401 updates information of the paper feed deck management table shown in FIG. 6 called from the HDD 404, stores in the HDD 404 and moves the processing on to step S1220. On the other hand, in a case in which it is determined in step S1218 that a pulling out of a paper feed deck is not detected, the CPU 401 advances the processing on to step S1217 (FIG. 12B). In step S1220, the CPU 401 determines whether or not the paper feed deck that is designated in the paper feed deck designation mode is pulled out or not. In a case in which it is determined in step S1220 that the paper feed deck that is designated in the paper feed deck designation mode is pulled out, the processing proceeds to step S1203, and the CPU 401 calls information of the paper feed deck management table from the HDD 404. On the other hand, in a case in which it is determined in step S1220 that the paper feed deck that is designated in the paper feed deck designation mode is not pulled out, the CPU 401 advances the processing on to step S1217.

In step S1203, the CPU 401 advances the processing onto step S1204 after having called information of the paper feed deck management table from the HDD 404. In step S1204, the CPU 401 calculates a maximum number of pages (MAX) of the paper selection screen from the number of paper feed decks that are attached and from the number of paper feed deck information items that can be displayed on the paper selection screen. Next, the processing proceeds to step S1205, and the CPU 401 determines if the mode is automatic paper selection mode or paper feed deck designation mode. In a case in which it is determined in step S1205 that the mode is paper feed deck designation mode (in other words, a paper feed deck is designated), the processing proceeds to step S1206 and the CPU 401 calculates the display page number N of a list displayed on the paper selection screen from the paper feed deck ID and the number of paper feed deck information items that can be displayed on the paper selection screen. Here, when the paper feed deck ID "9" is selected as in the previously described in FIG. 8, it is determined that the display page number N to display is "2" from the number of paper feed deck information items that can be displayed on the paper selection screen 811 (here, the number is five). Meanwhile, in a case in which it is determined in step S1205 that the mode is automatic paper selection mode (in other words, the paper feed deck is not specified), the processing proceeds to step S1208, and the CPU 401 determines that the display page number N of the paper selection screen is "1" as in the paper selection screen 711 of FIG. 7 for example.

Figure 1:
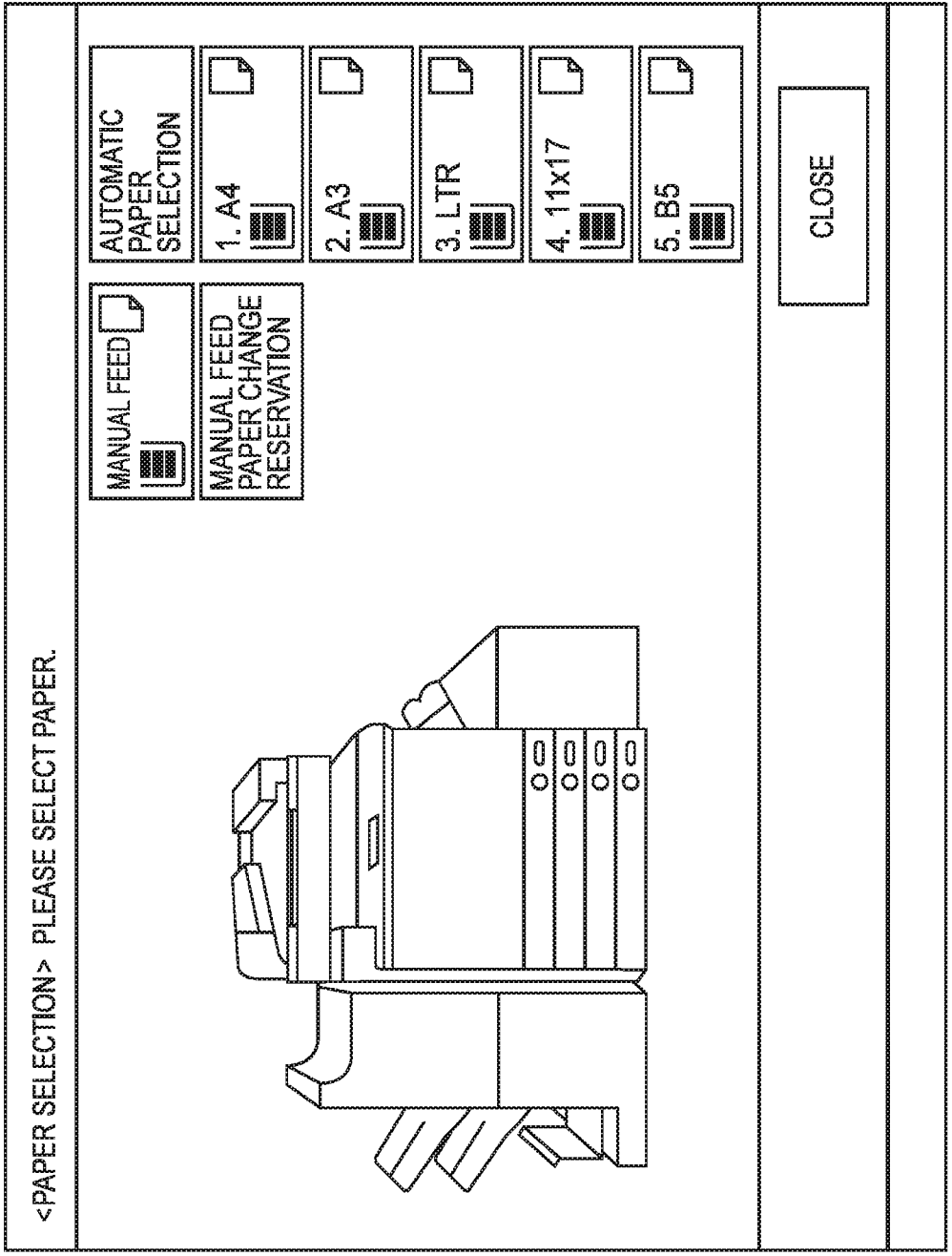
FIG. 1 depicts a view for illustrating an example of a conventional paper selection screen.
Figure 2:
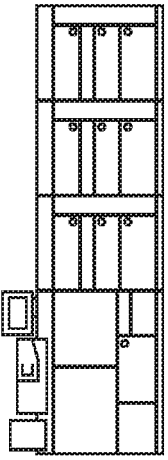
FIG. 2 depicts a view for illustrating an example of a paper selection screen displayed on a console unit of a conventional image forming apparatus.

After the execution of step S1206 or step S1208, the processing proceeds to step S1207 (FIG. 2B) and the CPU 401 causes the paper selection screen, denoted by numeral 711 in FIG. 7 or by numeral 811 in FIG. 8, to be displayed to the console unit 303 via the console unit I/F 406.

Then, the processing proceeds to step S1209, and the CPU 401 determines whether or not the page forward key (703 or 805) of the paper selection screen is pressed. In a case in which it is determined in step S1209 that the page forward key of the paper selection screen is pressed, the processing proceeds to step S1211 and the CPU 401 determines whether or not the display page number N is less than the maximum page number (MAX). In a case in which it is determined in step S1211 that the display page number N is less than the maximum page number MAX, the processing proceeds to step S1212, and the CPU 401 advances the processing on to step S1207 adding 1 to N to get the display page number N. On the other hand, in a case in which it is determined in step S1211 that the display page number N is not less than the maximum page number MAX, the CPU 401 advances the processing on to step S1207 without changing the displayed page.

Also, in a case in which in step S1209 it is determined that the page forward key of the paper selection screen is not pressed, the processing proceeds to step S1210, and the CPU 401 determines whether or not the page back key of the paper selection screen (704 or 804) is pressed. In a case in which it is determined that the page back key of the paper selection screen is pressed here, the processing proceeds to step S1214, and the CPU 401 determines whether or not the display page number N is greater than or equal to 2. In a case in which it is determined in step S1214 that the display page number N is greater than or equal to 2, the processing proceeds to step S1215, and the CPU 401 advances the processing on to step S1207 subtracting 1 from N to get the display page number N. On the other hand, in a case in which it is determined in step S1214 that the display page number N is not greater than or equal to 2, the CPU 401 advances the processing on to step S1207 without changing the displayed page.

Meanwhile, in a case in which it is determined in step S1210 that the page back key of the paper selection screen is not pressed, the processing proceeds to step S1213, and the CPU 401 determines whether or not the "OK" key of the paper selection screen is pressed. In a case in which it is determined in step S1213 that the "OK" key of the paper selection screen is pressed, the processing proceeds to step S1216, and the CPU 401 determines that the paper feed deck selected with the paper selection screen is the paper feed deck to be used for printing. Next, the paper selection screen is closed and the processing proceeds to step S1217. Meanwhile, in a case in which it is determined in step S1213 that the "OK" key of the paper selection screen is not pressed, the CPU 401 advances the processing on to step S1209. In step S1217, the CPU 401 determines whether or not the start key 503 of the console unit 303 is pressed. In a case in which it is determined in step S1217 that the start key 503 is pressed, the CPU 401 executes print processing by advancing the processing on to step S1221. Meanwhile, in a case in which it is determined in step S1217 that the start key 503 of the console unit 303 is not pressed, the CPU 401 advances the processing on to step S1201 (FIG. 2A) and input from the user is awaited.

In this way, according to the first embodiment, it is possible to determine a page number of a list display so that paper feed deck information corresponding to a designated paper feed deck can be displayed even in a case in which the number of paper feed decks is large and paper feed deck information list display cannot be fit onto the screen. Because of this, in the paper selection screen, it is possible for the user to immediately confirm paper feed deck information corresponding to a designated paper feed deck.

Figure 13A:
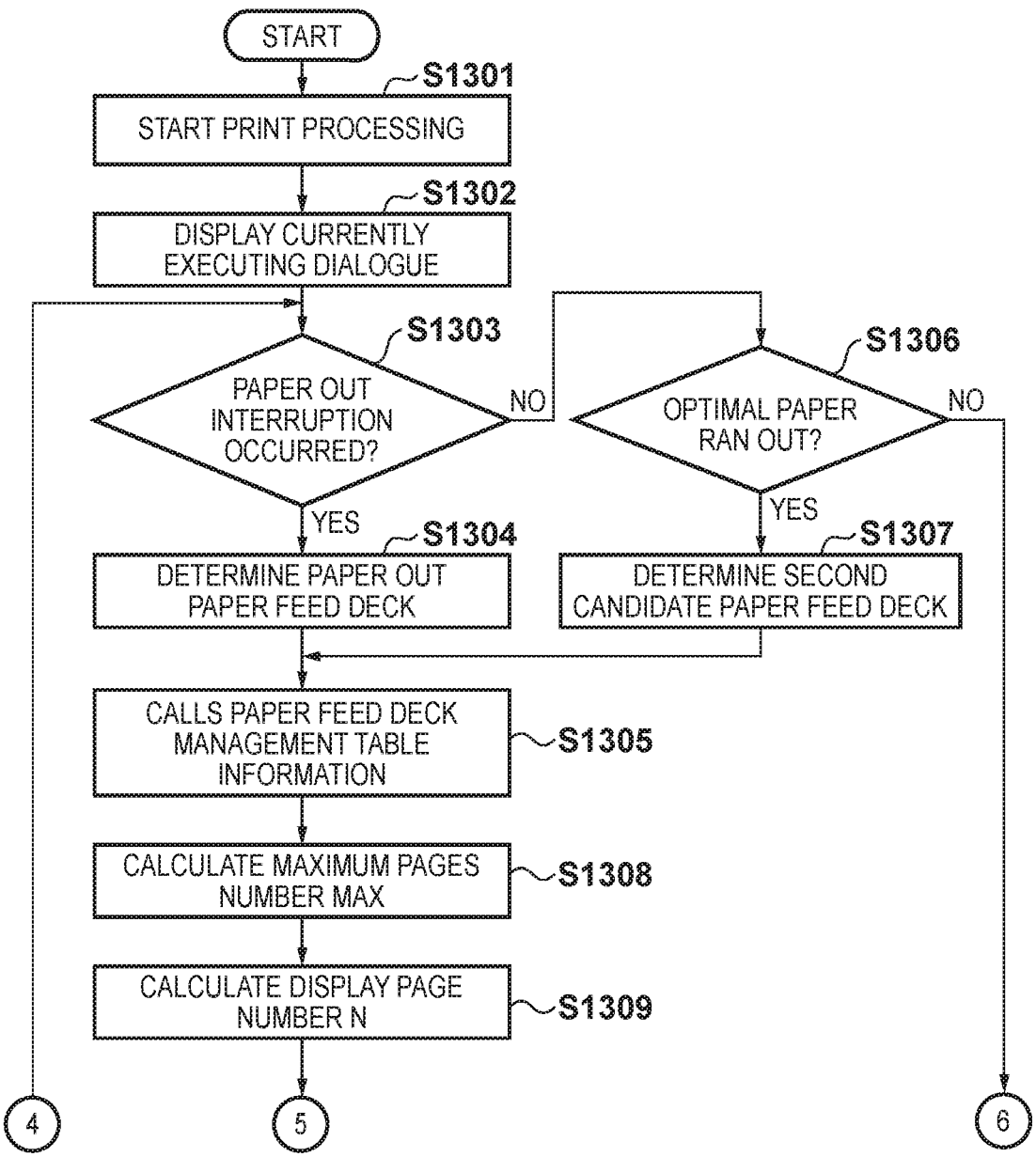
FIGS. 13A and 13B are flowcharts for describing a processing procedure for a case in which paper runs out during printing in the image forming apparatus according to the first embodiment.
Figure 13B:
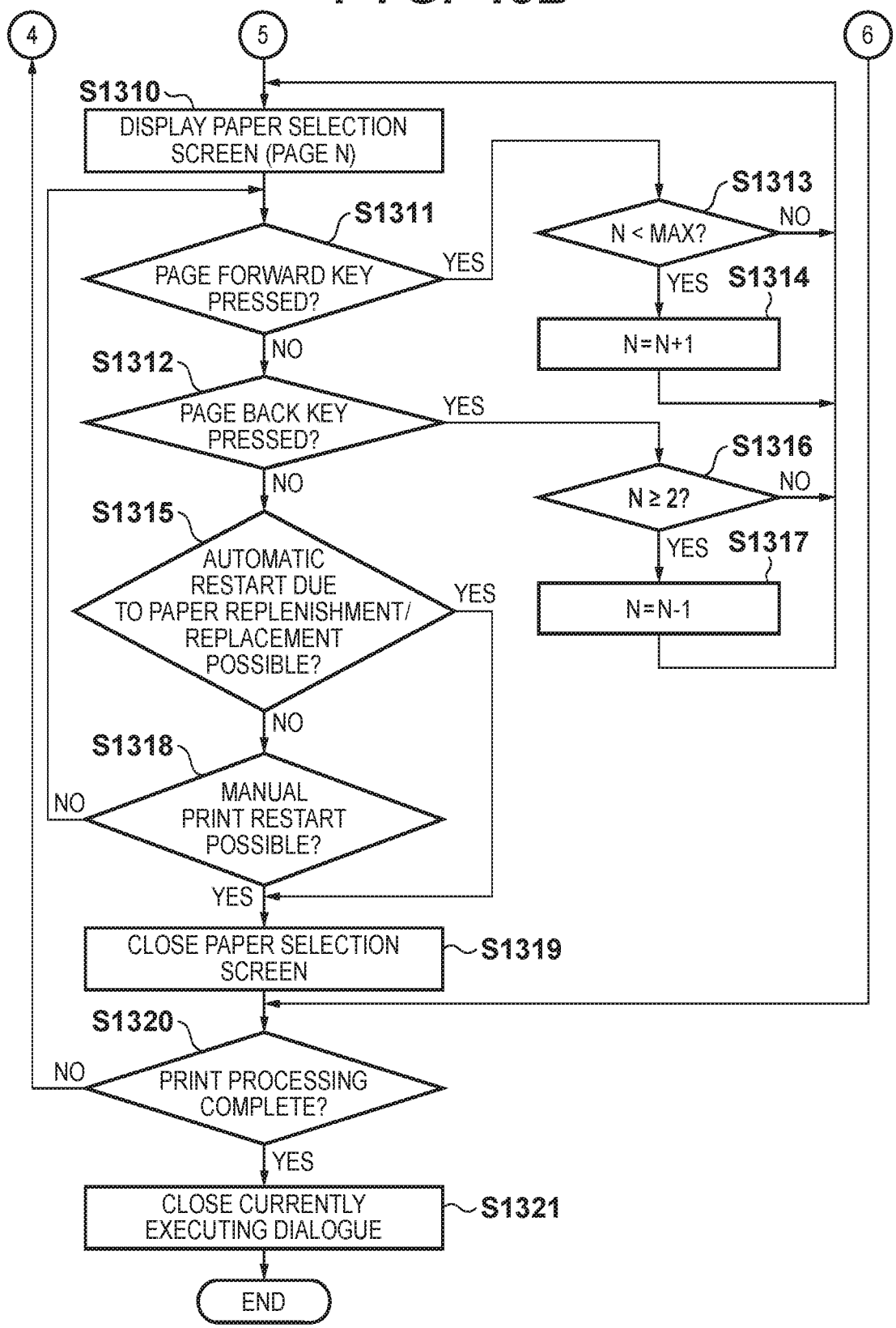

FIGS. 13A and 13B are flowcharts for describing a processing procedure for a case in which paper runs out during printing in the image forming apparatus 302 according to the first embodiment. A program for executing this processing procedure is stored in the ROM 403 or the HDD 404 of the controller 400 and is executed when needed by the CPU 401. With FIGS. 13A and 13B, explanation will be given focusing on display for the paper selection screen after print processing starts in step S1221 of FIG. 12.

Firstly, in step S1301, the CPU 401 starts print processing. After starting the print processing, the CPU 401, in step S1302, causes the currently executing dialogue, shown in the screen 1011 of FIG. 10 or in the screen 1111 of FIG. 11, to be displayed on the console unit 303 via the console unit I/F 406.

Then, in step S1303, the CPU 401 determines whether or not an interruption due to paper running out occurred. In a case in which it is determined in step S1303 that an interruption due to paper running out occurred, the process proceeds to step S1304. In step S1304, the CPU 401 determines the paper feed deck that ran out of paper, and advances the processing on to step S1305. On the other hand, in a case in which it is determined in step S1303 that an interruption due to paper running out did not occur, the processing proceeds on to step S1306, and the CPU 401 determines whether or not optimal paper ran out. In a case in which it is determined in step S1306 that optimal paper ran out, the processing proceeds to step S1307, the CPU 401 determines a paper feed deck from which paper feeding is possible to be a second candidate of the automatic paper selection mode and advances the processing on to step S1305. On the other hand, in a case in which in step S1306 it is determined that optimal paper has not run out, the CPU 401 advances the processing on to step S1320 (FIG. 13B).

In step S1305, the CPU 401 calls information of the paper feed deck management table from the HDD 404. Then, the processing proceeds to step S1308, and the CPU 401 calculates the maximum page number (MAX) of the paper selection screen from the number of paper feed decks that are attached and from the number of paper feed deck information items that can be displayed on the paper selection screen. Next, the processing proceeds to step S1309, and the CPU 401 calculates a list display page number N to display on the paper selection screen from the paper feed deck ID corresponding to a paper feed deck that ran out of paper or a second candidate paper feed deck and from the number of paper feed deck information items that can be displayed on the paper selection screen. This processing is the same as that of the previously described step S1206 of FIG. 12A. Next, the processing proceeds to step S1310 (FIG. 13B) and the CPU 401 causes the paper selection screen 1012 of FIG. 10 or the paper selection screen 1112 of FIG. 11 to be displayed to the console unit 303 via the console unit I/F 406. The display page number N of the paper selection screen is determined to be "2" in the paper selection screen 1012 of FIG. 10 or the paper selection screen 1112 of FIG. 11, and the second page paper selection screen is displayed.

Next, the processing proceeds to step S1311, and the CPU 401 determines whether the page forward key of the paper selection screen is pressed. In a case in which it is determined in step S1311 that the page forward key of the paper selection screen is pressed, the processing proceeds to step S1313 and the CPU 401 determines whether or not the display page number N is less than the maximum page number (MAX). In a case in which it is determined in step S1313 that the display page number N is less than the maximum page number MAX, the processing proceeds to step S1314, and the CPU 401 advances the processing on to step S1310 using a display page number N obtained by adding 1 to N. On the other hand, in a case in which it is determined in step S1313 that the display page number N is not less than the maximum page number MAX, the CPU 401 advances the processing on to step S1310 without changing the displayed page.

Meanwhile, in a case in which it is determined in step S1311 that the page forward key of the paper selection screen is not pressed, the processing proceeds to step S1312, and the CPU 401 determines whether or not the page back key of the paper selection screen is pressed. In a case in which it is determined in step S1312 that the page back key of the paper selection screen is pressed, the processing proceeds to step S1316, and the CPU 401 determines whether or not the display page number N is greater than or equal to 2. In a case in which it is determined in step S1316 that the display page number N is greater than or equal to 2, the processing proceeds to step S1317, and the CPU 401 advances the processing on to step S1310 using the display page number N obtained by subtracting 1 from N. On the other hand, in a case in which it is determined in step S1316 that the display page number N is not greater than or equal to 2, the CPU 401 advances the processing on to step S1310 without changing the displayed page.

Also, in a case in which it is determined in step S1312 that the page back key of the paper selection screen is not pressed, the processing proceeds to step S1315, and the CPU 401 determines whether or not automatic restart due to paper replenishment or paper replacement is possible. In a case in which it is determined that paper replenishment or paper replacement is executed and that automatic restart is possible, the processing proceeds to step S1319, and the CPU 401 closes the paper selection screen and continues print processing. On the other hand, in a case in which it is determined in step S1315 that automatic restart due to paper replenishment or paper replacement is not possible, the processing proceeds to step S1318, and the CPU 401 determines whether or not print restart by a manual pressing of the "OK" key (numeral 1002 or numeral 1103) of the paper selection screen is possible after paper replenishment or paper replacement. In a case in which it is determined in step S1318 that print restart by a manual pressing of the "OK" key of the paper selection screen is possible, the processing proceeds to step S1319 due to a pressing of the "OK" key, the CPU 401 closes the paper selection screen, continues the print processing, and advances the processing on to step S1320. On the other hand, in a case in which it is determined in step S1318 that print restart by a manual pressing of the "OK" key of the paper selection screen is not possible, the CPU 401 advances the processing on to step S1311.

In step S1320, the CPU 401 determines whether or not print processing has completed. In a case in which it is determined in step S1320 that print processing has completed, the CPU 401 advances the processing on to step S1321, and the CPU 401 closes the currently executing dialogue and completes the processing. On the other hand, in a case in which it is determined in step S1320 that the print processing has not completed, the CPU 401 advances the processing on to step S1303 (FIG. 13A).

According to the first embodiment, as explained above, it is possible to determine the list display page number in order to be able to display information for a paper feed deck that is detected to have run out of paper or candidate paper feed deck information, even in a case in which the number of paper feed decks is large and a list display of paper feed deck information does not fit on a screen. Because of this, a paper selection screen including a paper feed deck that ran out of paper or a second candidate paper feed deck can be confirmed without the user performing page forwarding on the paper selection screen.

As a result, it is possible for the user to quickly select a desired paper feed deck from out of a plurality of paper feed decks. Because of this, it is possible to improve user convenience and work efficiency when selecting a paper feed tray in a case in which a plurality of paper feed trays are provided.

Second Embodiment

The second embodiment of the present invention differs from the first embodiment on the following points. Other elements of the second embodiment are common to the elements corresponding to the first embodiment (FIG. 3 through FIG. 6). Also, in the second embodiment, only differences from the first embodiment will be explained, and explanation will be omitted for portions that are the same as in the first embodiment.

Firstly, explanation will be given for different types of screens shown on the display unit 502 of the console unit 303 of the image forming apparatus 302 with reference to FIG. 14 through FIG. 16.

Figure 14:
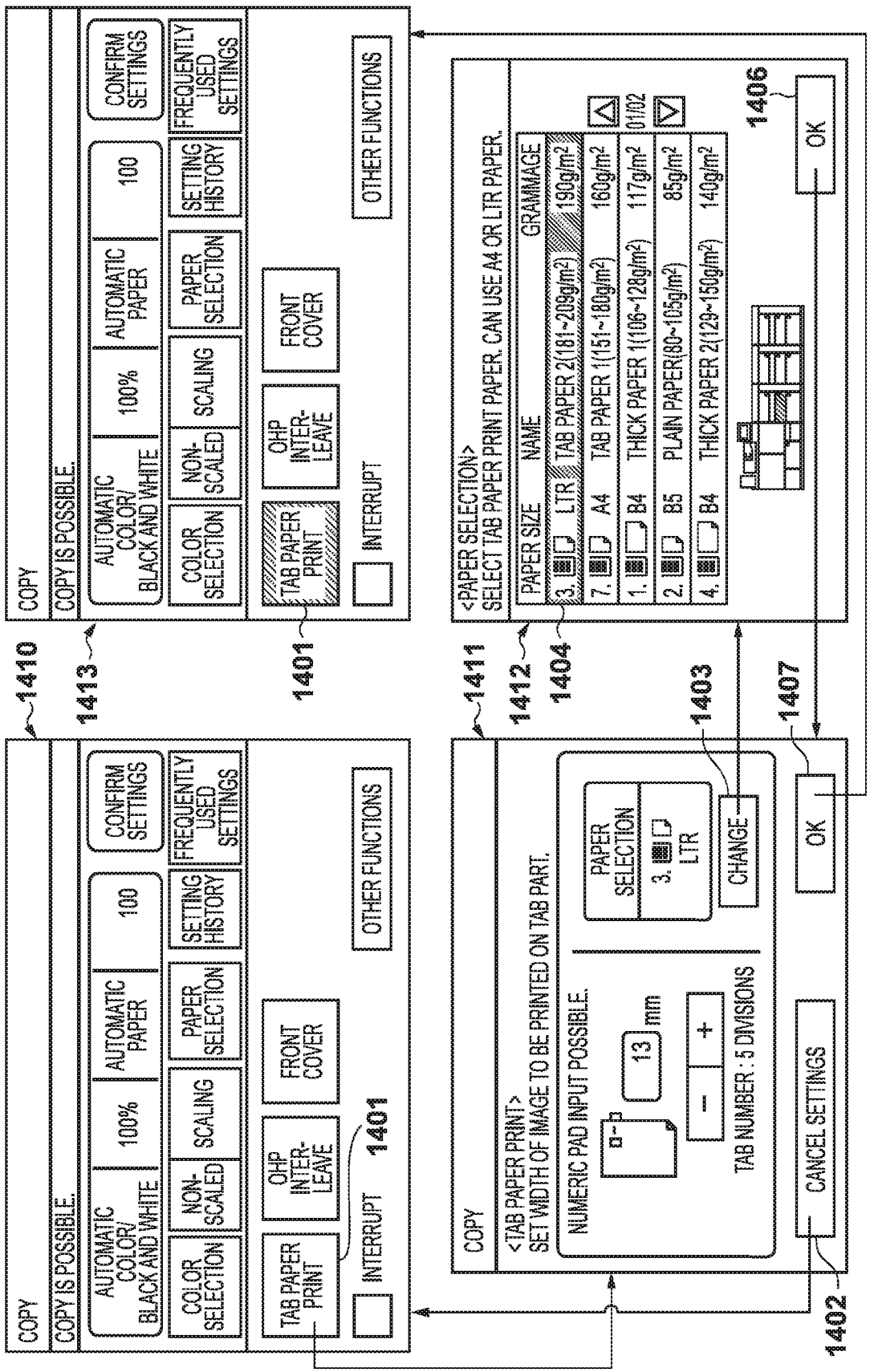
FIG. 14 depicts a view for illustrating an example of screen transition of a paper selection screen displayed in a tab paper print mode according to a second embodiment.

FIG. 14 depicts a view for illustrating an example of screen transition of the paper selection screen displayed in a tab paper print mode according to the second embodiment.

When the CPU 401 detects that a "tab paper print" key 1401 is pressed in a copy base screen 1410 of FIG. 14, it determines a paper feed deck that stores tab papers and displays a tab paper print screen 1411. In the tab paper print screen 1411, the paper feed deck 308 having paper feed deck ID "3", which is a paper feed deck in which tab paper is stored, is selected. Also, in the tab paper print screen 1411, a user can switch to a tab paper print mode by pressing an "OK" key 1407 in the bottom right of the screen in a state in which the paper feed deck in which tab papers are stored is selected.

Also, when the CPU 401 detects that a "setting cancel" key 1402 is pressed in the tab paper print screen 1411, it closes the tab paper print screen 1411 and returns to the copy base screen 1410. Also, when the CPU 401 detects that a "change" key 1403 is pressed in the tab paper print screen 1411, it displays a paper selection screen 1412 (first page). In the paper selection screen 1412, because the tab paper is stored in paper feed decks having the paper feed deck IDs "3" and "7", detailed information of the paper feed decks registered in the paper feed deck management table is displayed is list format in order of paper feed deck IDs "3"→"7"→"1"→"2"→"4". Also, in the paper selection screen 1412, a line 1404 corresponding to the currently selected paper feed deck ID "3" is invertedly displayed. Also, when the CPU 401 detects that an "OK" key 1406 is pressed in the paper selection screen 1412, it closes the paper selection screen 1412 and displays the tab paper print screen 1411.

Also, when the CPU 401 detects that an "OK" key 1407 is pressed in the tab paper print screen 1411, it closes the tab paper print screen 1411 and displays a copy base screen 1413. Because the copy base screen 1413 shows a state in which the tab paper print mode is set, a "tab paper print" key 1401 is invertedly displayed, and it is displayed that for printing, paper of an LTR size in a paper feed deck having paper feed deck ID "3" (tab paper 2) is used.

Figure 15:
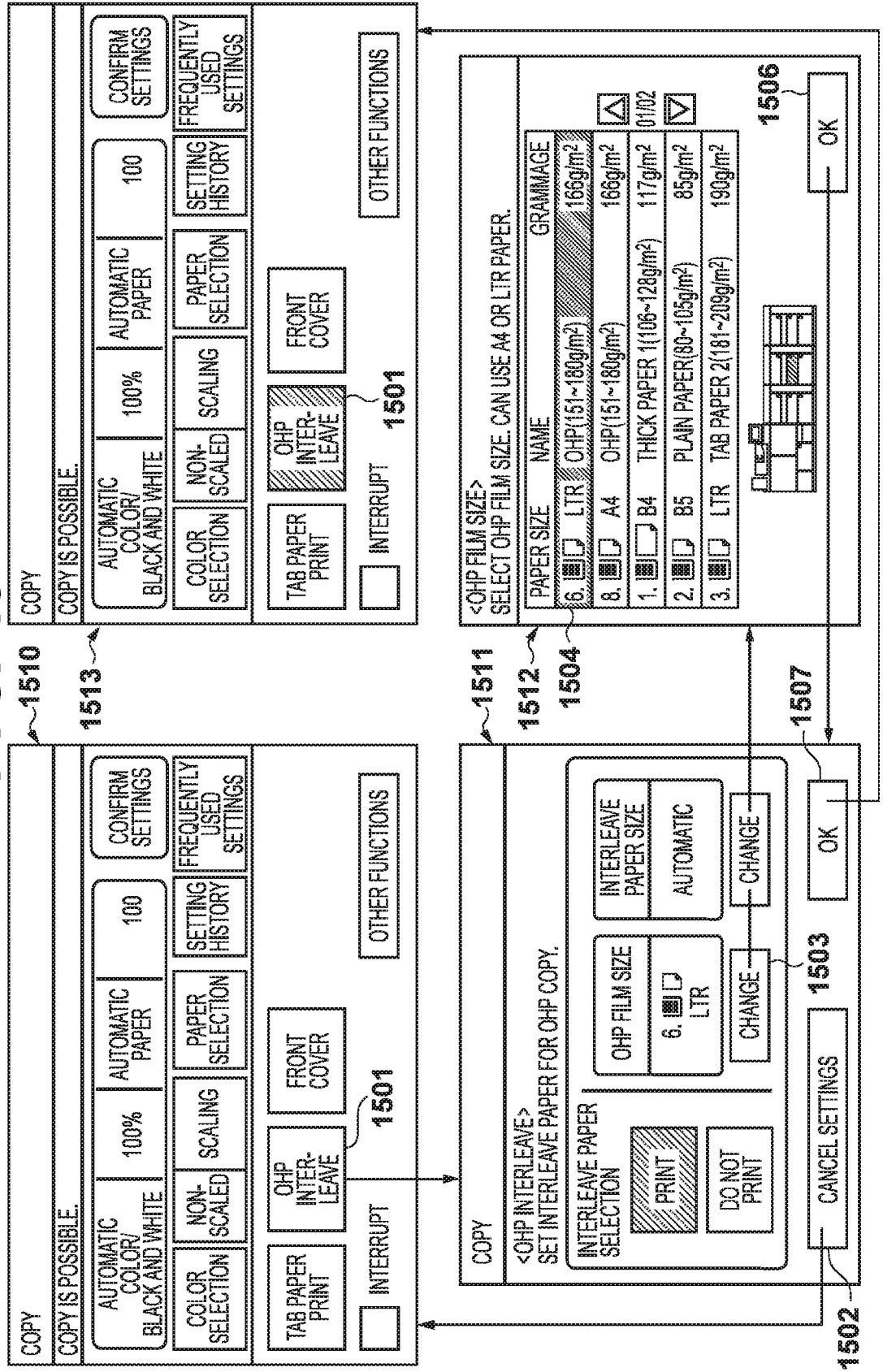
FIG. 15 depicts a view for illustrating an example of screen transition of a paper selection screen displayed in an overhead projector (OHP) interleave mode according to the second embodiment.

FIG. 15 depicts a view for illustrating an example of screen transition of the paper selection screen displayed in an OHP interleave mode according to the second embodiment.

When the CPU 401 detects that an "OHP interleave" key 1501 is pressed in a copy base screen 1510, it determines a paper feed deck in which OHP is stored and displays an OHP interleave screen 1511. In the OHP interleave screen 1511, the paper feed deck 311 having paper feed deck ID "6", which is a paper feed deck in which OHP sheets are stored, is selected.

Also, when the CPU 401 detects that a "setting cancel" key 1502 is pressed in the OHP interleave screen 1511, it closes the OHP interleave screen 1511 and returns to the copy base screen 1510. Also, when the CPU 401 detects that a "change" key 1503 is pressed in the OHP interleave screen 1511, it displays a paper selection screen 1512 (first page). Here, as shown in FIG. 6, OHP sheets are stored in paper feed decks having paper feed deck IDs "6" and "8". Thus, in the paper selection screen 1512, detailed information of the paper feed decks registered in the paper feed deck management table is displayed in list format in order of paper feed deck IDs "6"→"8"→"1"→"2"→"3". Also, in the paper selection screen 1512, a line 1504 corresponding to the currently selected paper feed deck ID "6" is invertedly displayed. Also, when the CPU 401 detects that an "OK" key 1506 is pressed in the paper selection screen 1512, it closes the paper selection screen 1512 and displays the OHP interleave screen 1511.

When the CPU 401 detects that an "OK" key 1507 is pressed in the OHP interleave screen 1511, it closes the OHP interleave screen 1511 and displays a copy base screen 1513. Because the copy base screen 1513 shows a state in which the OHP interleave mode is set, an "OHP interleave" key 1501 is invertedly displayed.

Figure 16:
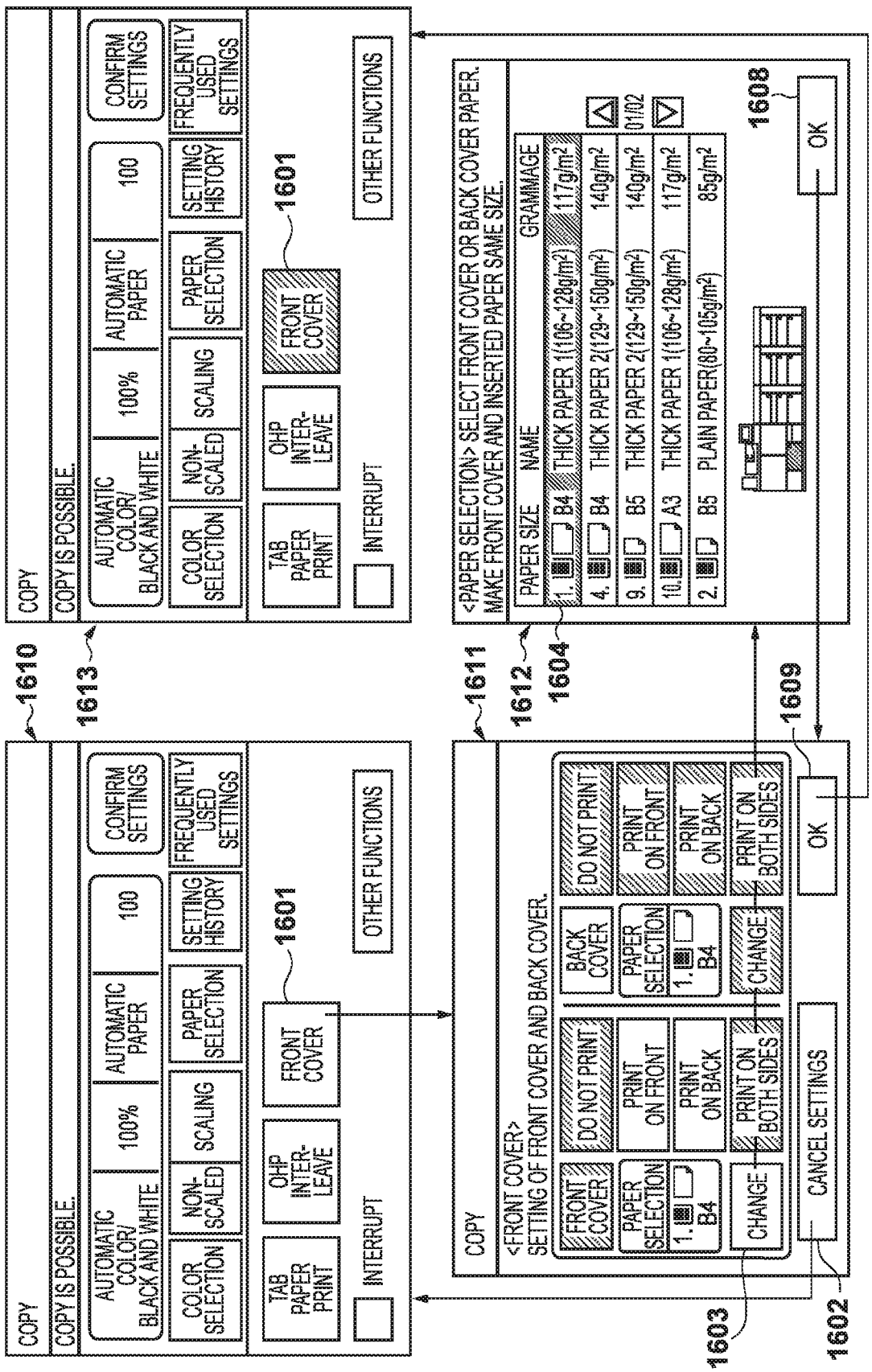
FIG. 16 depicts a view for illustrating an example of screen transition of a paper selection screen displayed in a front cover mode according to the second embodiment.

FIG. 16 depicts a view for illustrating an example of screen transition of the paper selection screen displayed in a front cover mode according to the second embodiment.

When the CPU 401 detects that a "front cover" key 1601 is pressed in a copy base screen 1610, it determines a paper feed deck, in which thick paper 1 or thick paper 2 is stored, and displays a front cover screen 1611. In the front cover screen 1611, the paper feed deck 306 having paper feed deck ID "1", which is a paper feed deck in which thick paper 1 or thick paper 2 is stored, is selected. Also, when the CPU 401 detects that an "OK" key 1609 is pressed in the front cover screen 1611 in a state in which the paper feed deck storing thick paper 1 or thick paper 2, it closes the front cover screen 1611 and displays a copy base screen 1613. Because the copy base screen 1613 shows a state in which the front cover mode is set, a "front cover" key 1601 is invertedly displayed.

Also, when the CPU 401 detects that a "setting cancel" key 1602 is pressed in the front cover screen 1611, it closes the front cover screen 1611 and returns to the copy base screen 1610. Also, when the CPU 401 detects that a "change" key 1603 is pressed in the front cover screen 1611, it displays a paper selection screen 1612 (first page). In the paper selection screen 1612, thick paper 1 or thick paper 2 is stored in paper feed decks having paper feed deck IDs "1", "4", "9" and "10". Thus, detailed information of the paper feed decks registered in the paper feed deck management table is displayed in list format in order of paper feed deck IDs "1"→"4"→"9"→"10"→"2". Also, in the paper selection screen 1612, a line 1604 corresponding to the currently selected paper feed deck ID "1" is invertedly displayed. Also, when the CPU 401 detects that an "OK" key 1608 is pressed in the paper selection screen 1612, it closes the paper selection screen 1612 and displays the front cover screen 1611.

As explained above, when corresponding paper feed information is displayed in a list in accordance with a selected feature, by causing the corresponding paper feed information to be displayed in a prioritized listing out of a plurality of paper feed information items, a user does not need to perform an operation such as page forwarding a list display.

Next, a characteristic processing procedure in the image forming apparatus 302 according to the second embodiment will be explained with reference to the flowchart of FIGS. 17A and 17B and FIGS. 18A to 18D.

Figure 17A:
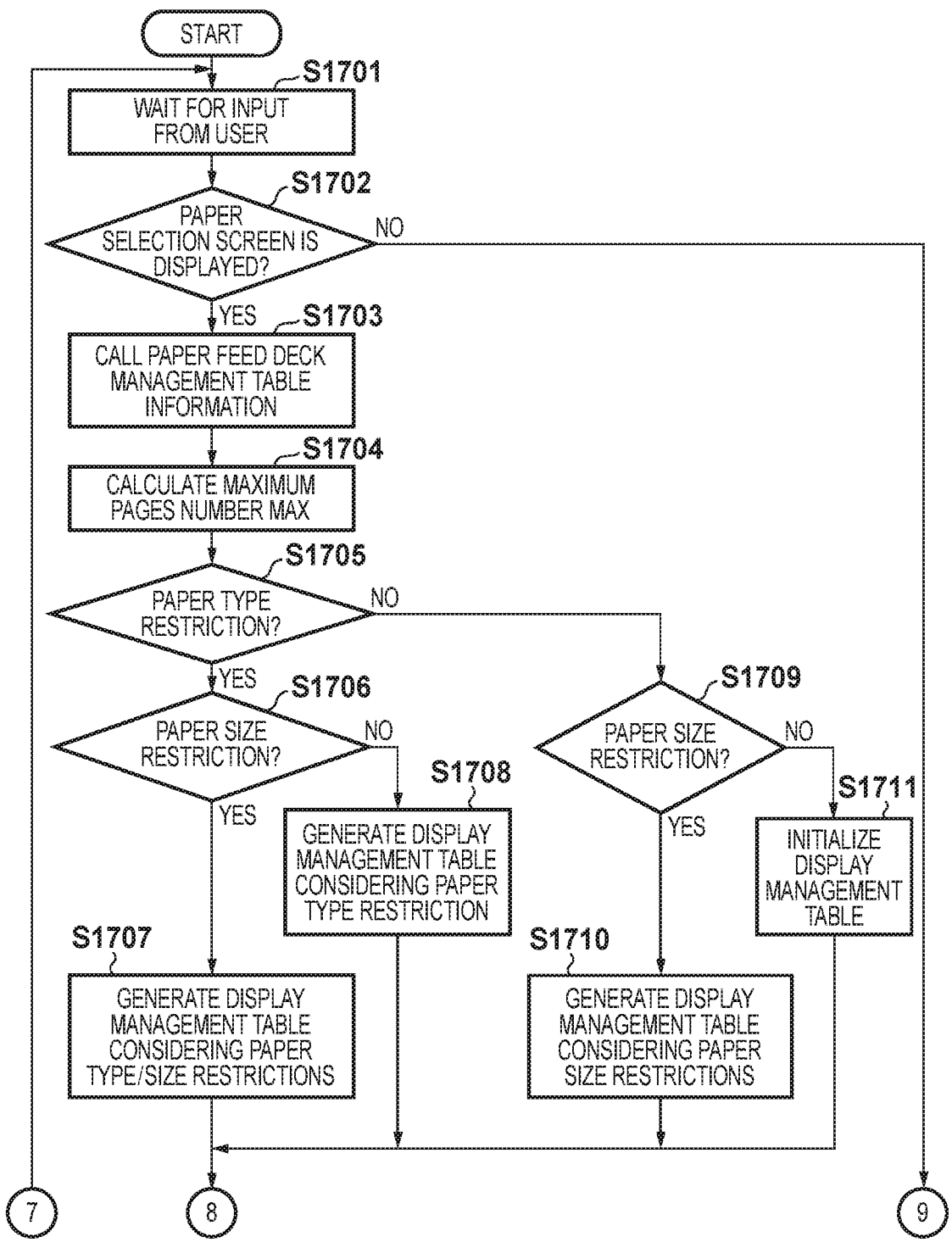
FIGS. 17A and 17B are flowcharts for describing a copy processing procedure in the image forming apparatus according to the second embodiment.
Figure 17B:
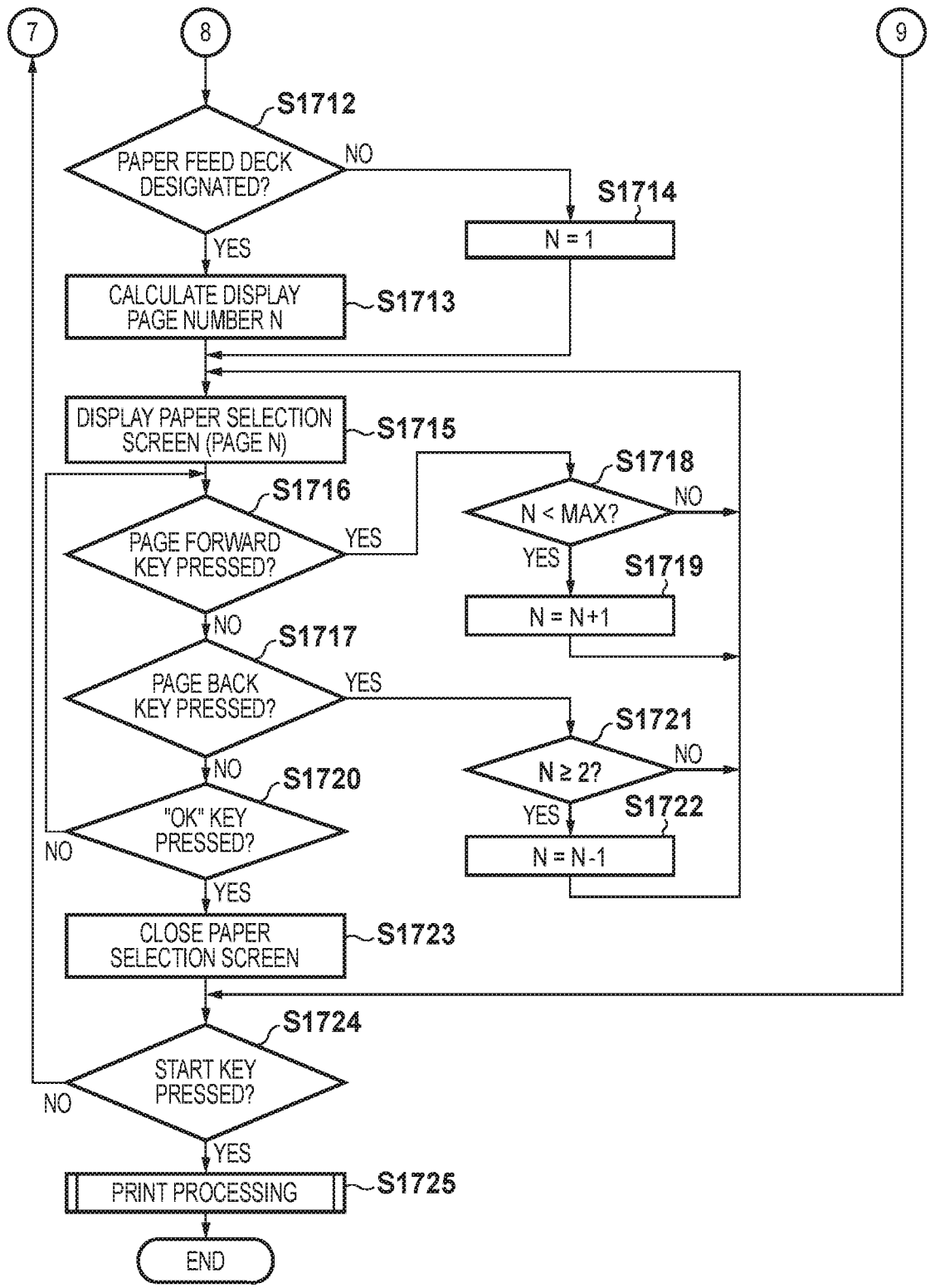

FIGS. 17A and 17B are flowcharts for describing a copy processing procedure in the image forming apparatus 302 according to the second embodiment. A program for executing this processing procedure is stored in the ROM 403 or the HDD 404 of the controller 400 and executed when needed by the CPU 401.

In FIG. 17A, firstly, in step S1701, the CPU 401 displays the copy base screen to the display unit 502 of the console unit 303 and advances to a state of waiting for input from the user. In a case in which input is performed by the user via the console unit 303, the processing proceeds to step S1702 and the CPU 401 determines whether or not there is a display instruction for the paper selection screen denoted by numeral 1412 in FIG. 14 or numeral 1512 in FIG. 15. Here, it is determined whether a "tab paper print" button, an "OHP interleave" button or a "front cover" button is pressed in the copy base screen 1410, 1510 or 1610 and furthermore, it is determined whether or not a "change" button 1403, 1503 or 1603 is pressed in a corresponding screen (numeral 1411, 1511 or 1611). In a case in which in step S1702 it is determined that there is a display instruction for the paper selection screen, the CPU 401 advances the processing on to step S1703. On the other hand, in a case in which in step S1702 it is determined that there is no display instruction for the paper selection screen, the CPU 401 advances the processing on to step S1724 (FIG. 17B).

In step S1703, the CPU 401 calls information of the paper feed deck management table from the HDD 404. Next, the processing proceeds to step S1704 and the CPU 401 calculates a maximum number of pages (MAX) of the paper selection screen from the number of paper feed decks that are attached and from the number of paper feed deck information items that can be displayed on the paper selection screen. Next, the processing proceeds to step S1705 and the CPU 401 determines whether or not there is a paper type restriction. In a case in which it is determined in step S1705 that there is a paper type restriction, the processing proceeds to step S1706, and the CPU 401 determines whether or not there is a paper size restriction. In a case in which it is determined in step S1706 that there is a paper size restriction, the processing proceeds to step S1707, and the CPU 401 generates a display management table considering a paper type restriction and a paper size restriction as shown in FIG. 18A.

FIGS. 18A through 18D depict views for illustrating examples of display management tables for managing display priority of paper feed decks displayed on the paper selection screen according to the second embodiment. In FIGS. 18A through 18D, paper size and paper type are recited, but in actuality, display priority and paper feed deck ID information is registered in the display management table. Note, this display management table information is stored in the RAM 402 by the CPU 401.

For example, FIG. 18A shows the display management table for when "tab paper print" mode is designated. Here, information of paper feed decks having paper feed deck IDs "3" and "7", which contain tab paper that can be used in "tab paper print" mode, are highly prioritized, and the selected paper feed deck ID "3" is the paper feed deck of the highest priority. With this, the paper selection screen 1412 of FIG. 14 is displayed.

Also, FIG. 18B shows the display management table for when "front cover" mode is designated. Here, information of paper feed decks having paper feed deck IDs "1", "4" and "9", which contain thick paper that can be used in "front cover" mode, are highly prioritized, and the selected paper feed deck ID "1" is the paper feed deck of the highest priority. With this, the paper selection screen 1612 of FIG. 16 is displayed.

Also, FIG. 18C shows the display management table for when the paper size is designated to be LTR or A4. Here, information of paper feed decks having paper feed deck IDs "3" and "6", which contain LTR size paper, are highly prioritized, and following them, information of paper feed decks having paper feed deck IDs "7" and "8", which contain A4 size paper, are stored. Furthermore, FIG. 18D shows the display management table initialized, and this is the same as the information of the paper feed deck management table shown in the previously described FIG. 6.

Returning once again to FIG. 17A, in a case in which it is determined in step S1706 that there is no paper size restriction, the processing proceeds to step S1708 and the CPU 401 generates a display management table considering paper type restriction, as shown in FIG. 18B.

On the other hand, in a case in which it is determined in step S1705 that the paper type is not restricted, the processing proceeds to step S1709 and the CPU 401 determines whether or not there is a paper size restriction. In a case in which it is determined in step S1709 that there is a paper size restriction, the processing proceeds on to step S1710 and the CPU 401 generates a display management table considering paper size restriction as shown in FIG. 18C. On the other hand, in a case in which in step S1709 it is determined that there is no paper size restriction, the processing proceeds to step S1711, and the CPU 401 performs initialization of the display management table, as shown in FIG. 18D.

When any of the steps S1707, S1708, S1710 or S1711 is executed, the processing proceeds to step S1712 (FIG. 17B) and the CPU 401 determines whether or not there is a designation of a paper feed deck. In a case in which it is determined in step S1712 that there is a designation of a paper feed deck, the processing proceeds to step S1713, and the CPU 401 calculates the display page number N of the list displayed in the paper selection screen from the paper feed deck ID and information of the display management table and advances the processing on to step S1715. On the other hand, in a case in which it is determined in step S1712 that there is no designation of a paper feed deck, the processing proceeds to step S1714, and the CPU 401 determines the display page number N of the paper selection screen "1" and advances the processing on to step S1715.

In step S1715, the CPU 401 causes the paper selection screen to be displayed on the console unit 303 via the console unit I/F 406, as shown in the paper selection screen 1412 of FIG. 14, the paper selection screen 1512 of FIG. 15 and the paper selection screen 1612 of FIG. 16, for example. Then, the processing proceeds to step S1716 and the CPU 401 determines whether or not the page forward key of the paper selection screen is pressed. In a case in which the page forward key of the paper selection screen is pressed in step S1716, the processing proceeds to step S1718, and the CPU 401 determines whether or not the display page number N is smaller than the maximum page number MAX. In a case in which it is determined in step S1718 that the display page number N is less than the maximum page number MAX, the processing proceeds to step S1719, and the CPU 401 advances the processing on to step S1715 using a display page number N obtained by adding 1 to N. On the other hand, in a case in which in step S1718 it is determined that the display page number N is not less than the maximum page number MAX, the CPU 401 advances the processing on to step S1715 without changing the displayed page.

Meanwhile, in a case in which it is determined in step S1716 that a page forward key of the paper selection screen is not pressed, the processing proceeds to step S1717, and the CPU 401 determines whether or not the page back key of the paper selection screen is pressed. In a case in which it is determined in step S1717 that the page back key of the paper selection screen is pressed, the processing proceeds to step S1721 and the CPU 401 determines whether the display page number N is greater than or equal to 2. In a case in which it is determined in step S1721 that the display page number N is greater than or equal to 2, the processing proceeds on to step S1722 and the CPU 401 advances the processing on to step S1715 using a display page number N obtained by subtracting 1 from N. On the other hand, in a case in which it is determined in step S1721 that the display page number N is not greater than or equal to 2, the CPU 401 advances the processing on to step S1715 without changing the displayed page.

Also, in a case in which it is determined in step S1717 that the page back key of the paper selection screen is not pressed, the processing proceeds on to step S1720 and the CPU 401 determines whether or not the "OK" key of the paper selection screen is pressed. In a case in which it is determined in step S1720 that the "OK" key of the paper selection screen is pressed, the processing proceeds on to step S1723 and the CPU 401 closes the paper selection screen, advances the processing on to step S1724, and displays the copy base screen indicating a state in which a mode is set.

On the other hand, in a case in which it is determined in step S1720 that the "OK" key of the paper selection screen is not pressed, the CPU 401 advances the processing on to step S1716. In step S1724, the CPU 401 determines whether or not the start key 503 of the console unit 303 is pressed. In a case in which it is determined in step S1724 that the start key 503 is pressed, the CPU 401 advances the processing on to step S1725, and the CPU 401 completes this processing by performing the print processing shown in FIGS. 13A and 13B. On the other hand, in a case in which it is determined in step S1724 that the start key 503 of the console unit 303 is not pressed, the CPU 401 advances the processing on to step S1701 (FIG. 17A) and waits for input from the user.

With the second embodiment as explained above, it is possible to display in a paper selection screen information of paper feed decks containing paper that corresponds to selectable paper on a head page of paper selection screen in a case in which there is a paper type restriction or a paper size restriction. As a result, it is possible for a user to quickly select a target paper feed deck from out of a plurality of paper feed decks. Because of this, it is possible to improve user convenience and work efficiency when selecting a desired paper feed tray from out of a plurality of paper feed trays.

Third Embodiment

The third embodiment of the present invention differs from the first and second embodiments on the following points. Other elements of the third embodiment are common to the elements corresponding to the first embodiment (FIG. 3 through FIG. 6). In the third embodiment, only differences with the first and second embodiments will be explained, and explanation will be omitted for parts that are the same as in the first and second embodiments.

First, explanation will be given for different types of screens shown on the display unit 502 of the console unit 303 of the image forming apparatus 302 with reference to FIG. 19 through FIG. 23.

Figure 19:
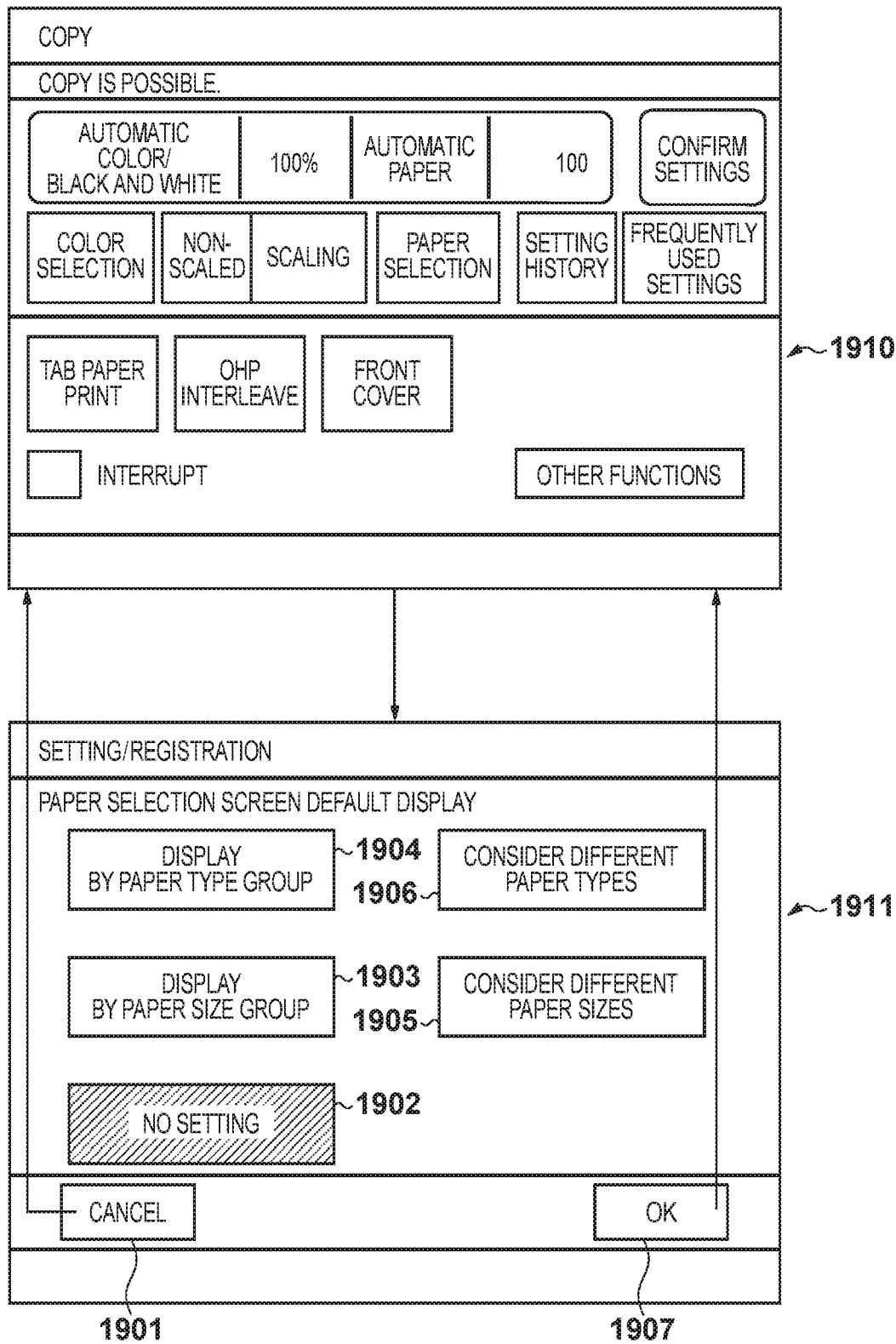
FIG. 19 depicts a view for illustrating an example of screen transition for a setting/registration screen displayed when a setting/registration key on the console unit is pressed according to a third embodiment.

FIG. 19 depicts a view for illustrating an example of screen transition for a setting/registration screen displayed when the setting/registration key 507 on the console unit 303 is pressed according to a third embodiment.

When the CPU 401 detects that the setting/registration key 507 is pressed in a state in which a copy base screen 1910 is displayed, it displays a setting/registration screen 1911. Note, the setting/registration screen 1911 is a screen for changing settings of the default display method of the paper selection screen. In the setting/registration screen 1911, there are a "no setting" key 1902, a "display by paper size group" key 1903, a "display by paper type group" key 1904, a "consider different paper sizes" key 1905, and a "consider different paper types" key 1906. Also, in the setting/registration screen 1911, as a default display method of the paper selection screen, as shown in the paper selection screens 711 and 712 of FIG. 7 for example, the "no setting" key 1902 is invertedly displayed so the control is performed for displaying paper feed deck IDs "1" through "10".

In the setting/registration screen 1911, after the user selects one of the keys out of numerals 1902 through 1906, and presses an "OK" key 1907 in the bottom right of the screen, the CPU 401 stores the selected setting in the HDD 404. With this, it is possible to later switch the method default display method of the paper selection screen. When the CPU 401 detects that a "cancel" key 1901 or the "OK" key 1907 is pressed on the setting/registration screen 1911, the setting/registration screen 1911 is closed.

Figure 20:
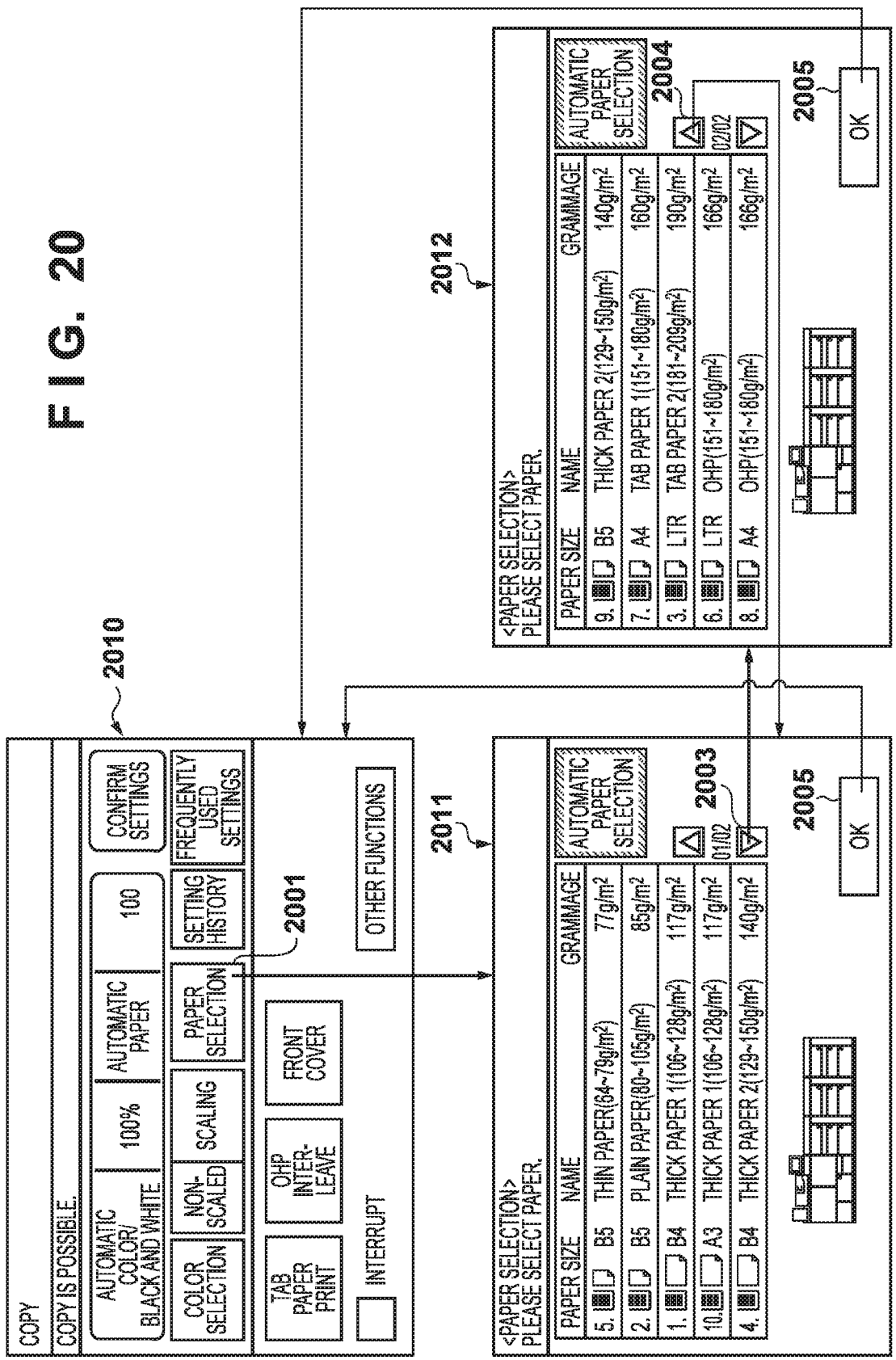
FIG. 20 depicts a view for illustrating an example of screen transition of a paper selection screen in a case in which a "display by paper type group" mode is set according to the third embodiment.

FIG. 20 depicts a view for illustrating an example of screen transition of the paper selection screen in a case in which a "display by paper type group" mode is set using the "display by paper type group" key 1904 according to the third embodiment.

In a copy base screen 2010, an automatic paper selection mode is set. When the CPU 401 detects that a "paper selection" key 2001 is pressed in the copy base screen 2010, it displays a paper selection screen 2011 (first page). In the paper selection screen 2011, detailed information of paper feed decks registered in the paper feed deck management table is displayed in list format in paper feed deck ID order "5"→"2"→"1"→"10"→"4" in order show classification into thin paper, plain paper, thick paper, tab paper, and OHP groups. When the CPU 401 detects that a page forward key 2003 is pressed in the paper selection screen 2011, it displays a paper selection screen 2012 (second page).

In the paper selection screen 2012, classification into thin paper, plain paper, thick paper, tab paper, and OHP groups is shown, and detailed information of paper feed decks is displayed in list format in paper feed deck ID order "9"→"7"→"3"→"6"→"8" continuing from the paper selection screen 2011. When the CPU 401 detects that a page back key 2004 is pressed in the paper selection screen 2012, it displays the paper selection screen 2011 (first page). When the CPU 401 detects that an "OK" key 2005 is pressed in paper selection screen 2011 or 2012, the paper selection screen is closed and the copy base screen 2010 is returned to.

In this way, when "display by paper type group" mode is set, a paper feed deck information list is displayed in a format organized by type of the contained paper.

Figure 21:
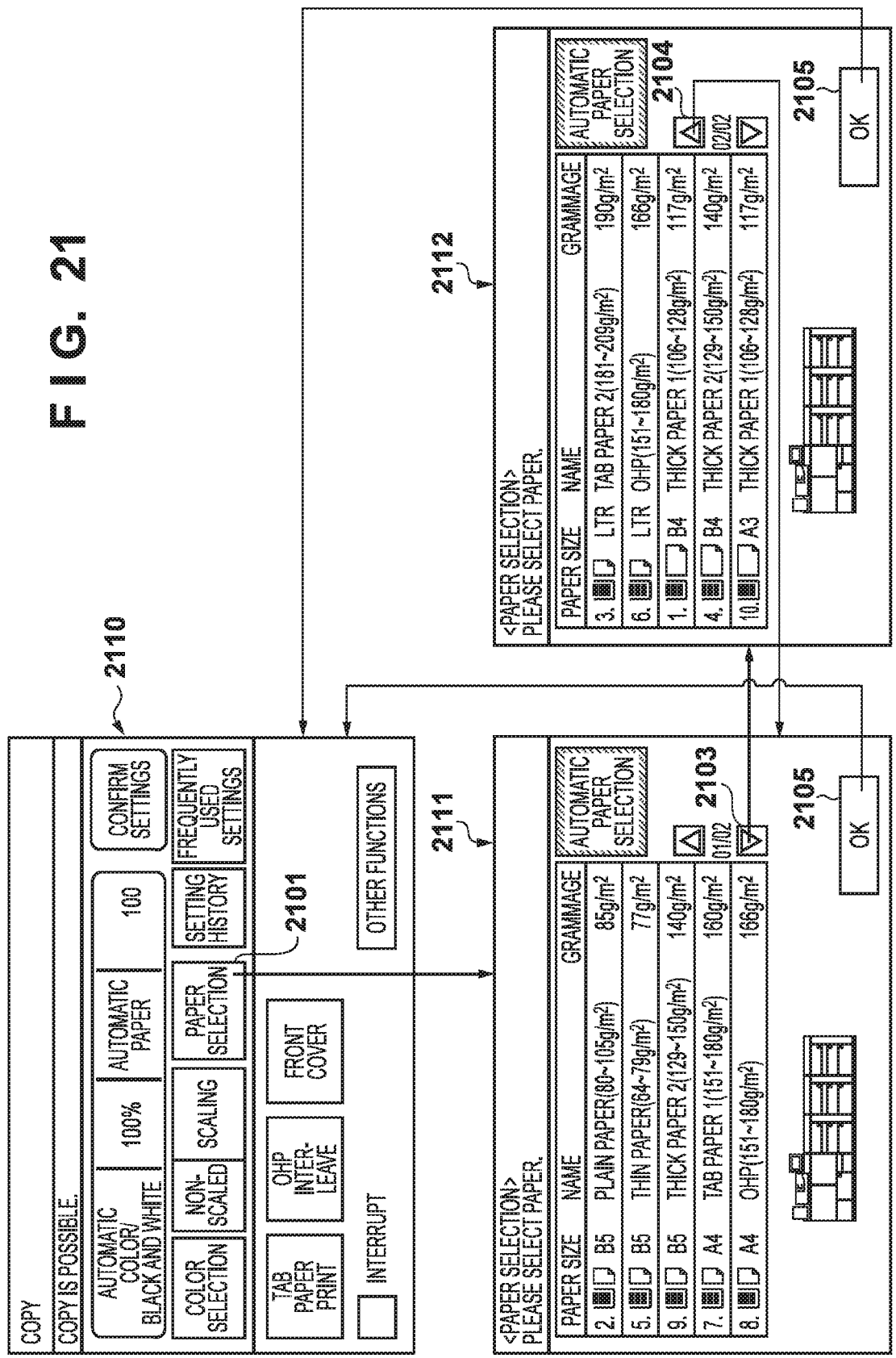
FIG. 21 depicts a view for illustrating an example of screen transition of a paper selection screen in a case in which a "display by paper size group" mode is set according to the third embodiment.

FIG. 21 depicts a view for illustrating an example of screen transition of the paper selection screen in a case in which a "display by paper size group" mode is set using the "display by paper size group" key 1903 according to the third embodiment.

In a copy base screen 2110, an automatic paper selection mode is set. When the CPU 401 detects that a "paper selection" key 2101 is pressed in the copy base screen 2110, it displays a paper selection screen 2111 (first page). In the paper selection screen 2111, detailed information of paper feed decks registered in the paper feed deck management table is displayed in list format in paper feed deck ID order "2"→"5"→"9"→"7"→"8" in order show classification into B5, A4, LTR, B4, and A3 paper size groups. When the CPU 401 detects that a page forward key 2103 is pressed in the paper selection screen 2111, it displays a paper selection screen 2112 (second page).

In the paper selection screen 2112, classification into B5, A4, LTR, B4, and A3 paper size groups is shown, and detailed information of paper feed decks is displayed in list format in paper feed deck ID order "3"→"6"→"1"→"4"→"10" continuing from the paper selection screen 2111. When the CPU 401 detects that a page back key 2104 is pressed in the paper selection screen 2112, it displays the paper selection screen 2111 (first page). When the CPU 401 detects that an "OK" key 2105 is pressed in paper selection screen 2111 or 2112, the paper selection screen is closed and the copy base screen 2110 is returned to.

In this way, when "display by paper size group" mode is set, a paper feed deck information list is displayed in a format organized by size of the contained paper.

FIG. 22 depicts a view for illustrating an example of screen transition of the paper selection screen in a case in which a "consider different paper types" mode is set using the "consider different paper types" key 1906 according to the third embodiment.

In a copy base screen 2210, an automatic paper selection mode is set. When the CPU 401 detects that a "paper selection" key 2201 is pressed in the copy base screen 2210, it displays a paper selection screen 2211 (first page). In the paper selection screen 2211, differing paper types of thin paper, plain paper, thick paper, tab paper, and OHP are displayed in a first page. For this reason, detailed information of paper feed decks registered in the paper feed deck management table is displayed in paper feed deck ID order "5"→"2"→"1"→"3"→"6". When the CPU 401 detects that a page forward key 2203 is pressed in the print paper selection screen 2211, it displays a paper selection screen 2212 (second page). In the paper selection screen 2212, detailed information of paper feed decks registered in the paper feed deck management table is displayed in list format in paper feed deck ID order "4"→"7"→"8"→"9"→"10" continuing from the paper selection screen 2211. When the CPU 401 detects that a page back key 2204 is pressed in the paper selection screen 2212, it displays the paper selection screen 2211 (first page). When the CPU 401 detects that an "OK" key 2205 is pressed in paper selection screen 2211 or 2212, the paper selection screen is closed and the copy base screen 2210 is returned to.

In this way, when "consider different paper types" mode is set, a paper feed deck information list in which paper types are different from each other is displayed on the paper selection screen.

FIG. 23 depicts a view for illustrating an example of screen transition of the paper selection screen in a case in which a "consider different paper sizes" mode is set using the "consider different paper sizes" key 1905 according to the third embodiment.

In a copy base screen 2310, an automatic paper selection mode is set. When the CPU 401 detects that a "paper selection" key 2301 is pressed in the copy base screen 2310, it displays a paper selection screen 2311 (first page). In the paper selection screen 2311, differing paper sizes of B5, A4, LTR, B4, and A3 are displayed in a first page. For this reason, detailed information of paper feed decks registered in the paper feed deck management table is displayed in paper feed deck ID order "2"→"7"→"3"→"1"→"10". When the CPU 401 detects that a page forward key 2303 is pressed in the print paper selection screen 2311, it displays a paper selection screen 2312 (second page).

In the paper selection screen 2312, detailed information of paper feed decks registered in the paper feed deck management table is displayed in list format in paper feed deck ID order "4"→"5"→"6"→"8"→"9" continuing from the paper selection screen 2311. When the CPU 401 detects that a page back key 2304 is pressed in the paper selection screen 2312, it displays the paper selection screen 2311 (first page). When the CPU 401 detects that an "OK" key 2305 is pressed in paper selection screen 2311 or 2312, the paper selection screen is closed and the copy base screen 2310 is returned to.

In this way, when "consider different paper sizes" mode is set, a paper feed deck information list in which paper sizes are different from each other is displayed to the paper selection screen.

Next, explanation will be given for characteristic processing procedure in the image forming apparatus with reference to the flowchart of FIGS. 24A and 24B and FIGS. 25A to 25E.

Figure 24A:
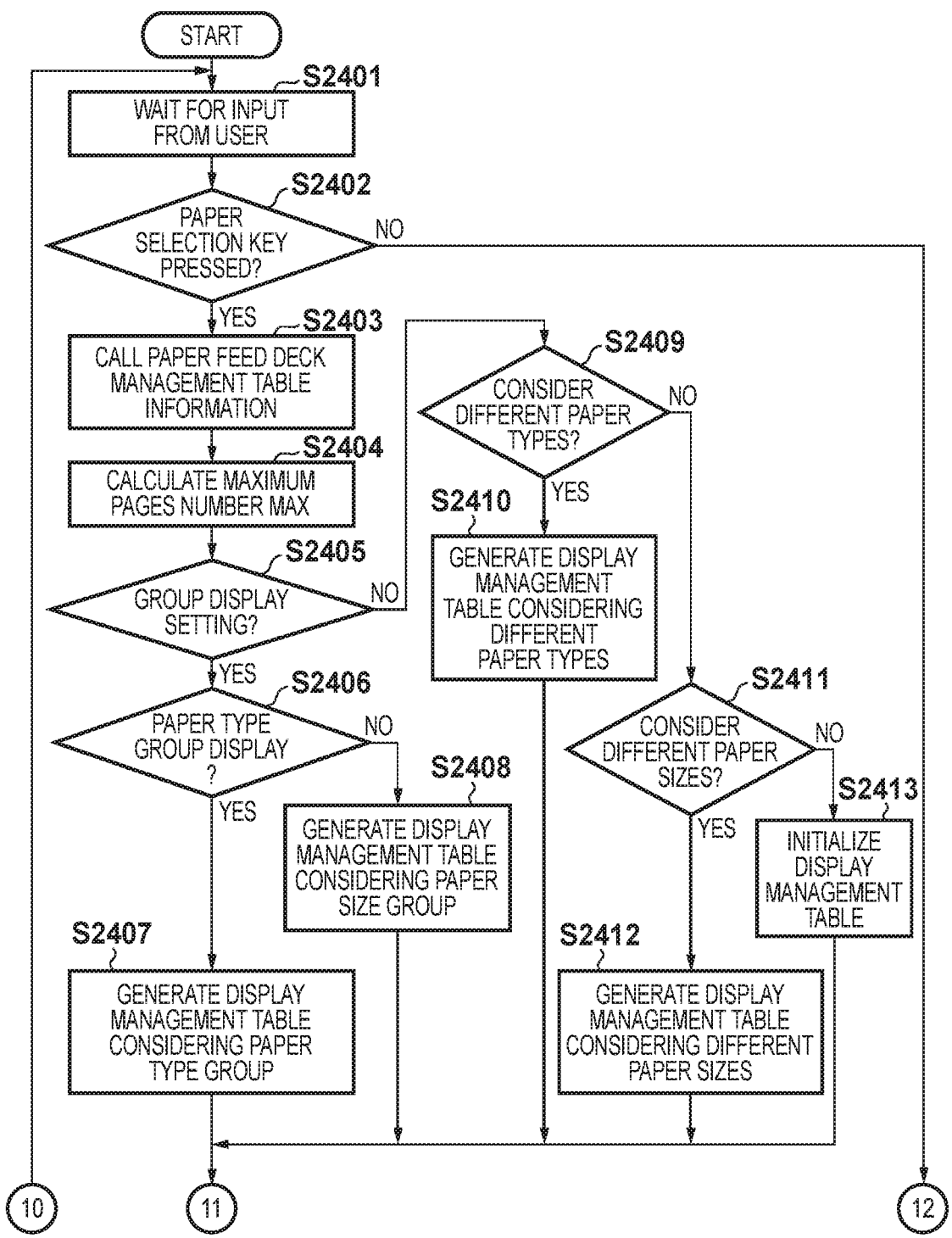
FIGS. 24A and 24B are flowcharts for describing a copy processing procedure in the image forming apparatus according to the third embodiment.
Figure 24B:
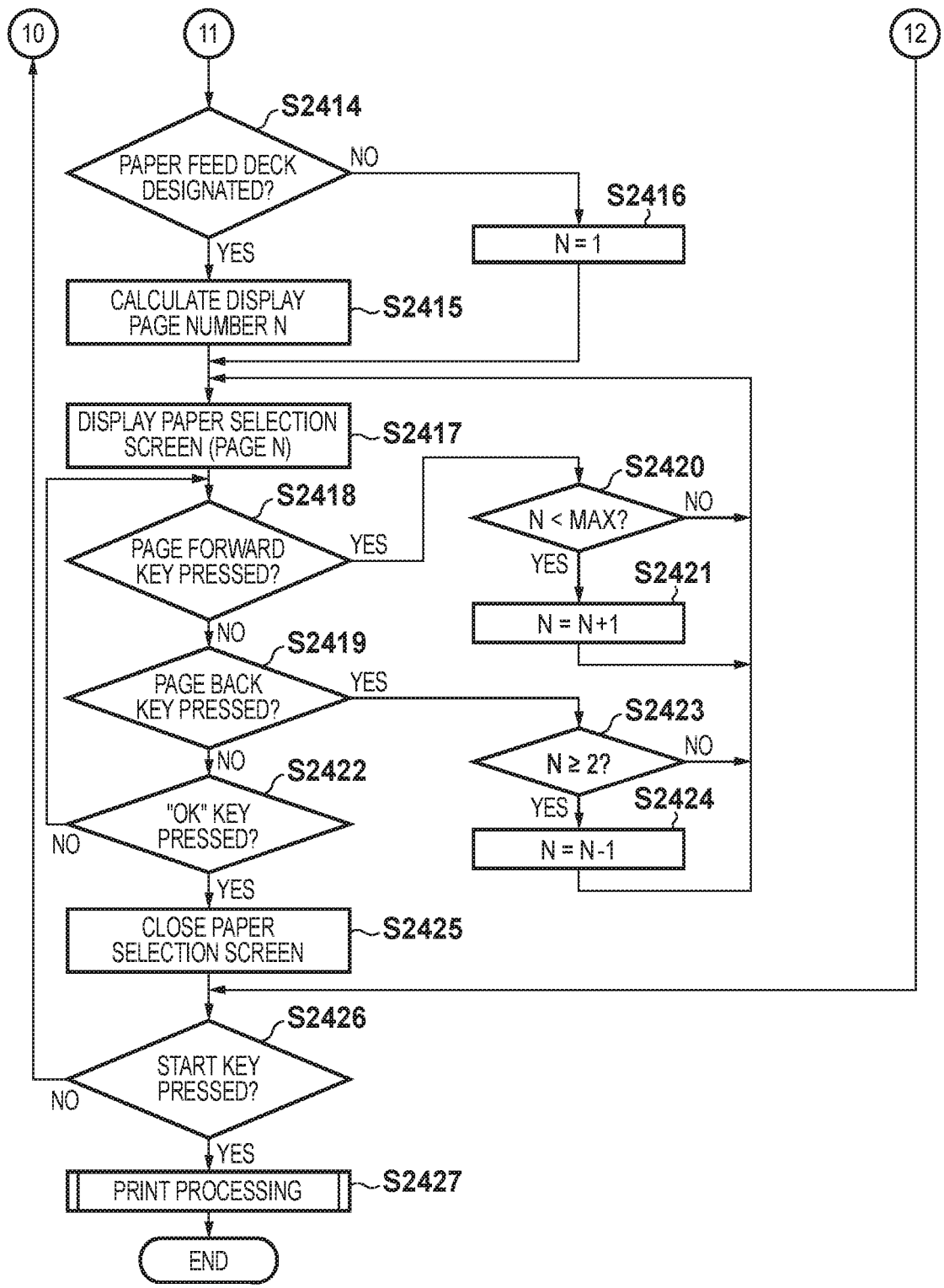

FIGS. 24A and 24B are flowcharts for describing a copy processing procedure in the image forming apparatus 302 according to the third embodiment. This processing procedure is stored in the ROM 403 or the HDD 404 of the controller 400 and executed when needed by the CPU 401.

In FIG. 24A, first, in step S2401, the CPU 401 displays the copy base screen and advances to a state of waiting for input from the user. When input is performed by the user with the console unit 303, the processing proceeds to step S2402 and the CPU 401 determines whether or not there the paper selection key is pressed. In a case in which it is determined in step S2402 that the paper selection key is pressed and that there is a display instruction for the paper selection screen, the processing proceeds to step S2403. On the other hand, in a case in which in step S2402 it is determined that there is no display instruction for the paper selection screen, the CPU 401 advances the processing on to step S2426 (FIG. 24B). In step S2403, the CPU 401 calls information of the paper feed deck management table from the HDD 404. Next, the processing proceeds to step S2404, and the CPU 401 calculates a maximum number of pages (MAX) of the paper selection screen from the number of paper feed decks that are attached and from the number of paper feed deck information items that can be displayed on the paper selection screen.

Next, the processing proceeds to step S2405, and the CPU 401 determines whether or not the group display shown in FIG. 19 is set as the default display of the paper selection screen. In a case in which it is determined in step S2405 that the group display is set the processing proceeds to step S2406, and the CPU 401 determines whether or not it is paper type group display. In a case in which it is determined in step S2406 that it is paper type group display the processing proceeds to step S2407, and the CPU 401 generates a display management table considering paper type groups as shown in FIG. 25A.

FIGS. 25A through 25E depict views for illustrating examples of display management tables for managing display precedence of paper feed decks to be displayed on the paper selection screen according to the third embodiment.

FIG. 25A is showing an example in which the display management table of FIG. 6 is changed into a display management table considering paper type groups. Here, the display precedence order is thin paper, plain paper, thick paper, tab paper, OHP.

FIG. 25B is showing an example in which the display management table of FIG. 6 is changed into a display management table considering paper size groups. Here, the display precedence order is B5, A4, LTR, B4, A3.

FIG. 25C is showing an example in which the display management table of FIG. 6 is changed into a display management table considering different paper types. Here, it is set so that paper feed deck information of paper feed deck IDs "5", "2", "1", "3", and "6" corresponding to thin paper, plain paper, thick paper, tab paper, and OHP, respectively, is displayed on the first page of the paper selection screen. Similarly, it is set so that paper feed deck information of paper feed deck IDs "4", "7", "8", "9", and "10" corresponding to thick paper 2, tab paper 1, OHP, thick paper 2, and thick paper 1, respectively, is displayed on the second page of the paper selection screen.

FIG. 25D is showing an example in which the display management table of FIG. 6 is changed into a display management table considering different paper sizes. Here, it is set so that paper feed deck information of paper feed deck IDs "2", "773", "1", and "10" corresponding to B5, A4, LTR, B4, and A3, respectively, is displayed on the first page of the paper selection screen. Similarly, it is set so that paper feed deck information of paper feed deck IDs "4", "5", "6", "8" and "9" corresponding to B4, B5, LTR, A4, and B5, respectively, is displayed on the second page of the paper selection screen.

FIG. 25E shows information of the initialized display management table and this corresponds to the display management table of FIG. 6.

Note, information of this display management table is stored in the RAM 402 by the CPU 401.

Once again returning to FIG. 24A, in a case in which it is determined in step S2406 that it is not paper type group display (in other words, it is paper size group display), the processing proceeds to step S2408 and the CPU 401 generates a display management table considering paper size groups as shown in FIG. 25B.

On the other hand, in a case in which in step S2405 group display is not set, the processing proceeds to step S2409 and the CPU 401 determines whether or not the default display of the paper selection screen is different paper types. In a case in which it is determined in step S2409 that different paper types are considered, the processing proceeds to step S2410, and the CPU 401 generates a display management table considering different paper types. Also, in a case in which it is determined in step S2409 that different paper types are not considered, the processing proceeds to step S2411, and the CPU 401 determines whether or not the default display method of the paper selection screen considers different paper sizes. In a case in which it is determined in step S2411 that different paper sizes are considered, the processing proceeds to step S2412 and the CPU 401 generates a display management table considering different paper sizes. Also, a case in which it is determined in step S2411 that different paper sizes are not considered, the processing proceeds to step S2413 and the CPU 401 perform initialization of the display management table as shown in FIG. 25E.

When any of steps S2407, S2408, S2412, or S2413 are executed in this way, the processing proceeds to step S2414 (FIG. 24B) and the CPU 401 determines whether or not there is a designation of a paper feed deck. In a case in which it is determined in step S2414 that there is a designation of a paper feed deck, the processing proceeds to step S2415, and the CPU 401 calculates the display page number N of a list displayed to the paper selection screen from the paper feed deck ID and information of the display management table. On the other hand, when it is determined in step S2414 that there is no designation of the paper feed deck, the processing proceeds to step S2416, and the CPU 401 determines that the display page number N of the paper selection screen is "1" and advances the processing on to step S2417.

In step S2417, the CPU 401 causes a paper selection screen, such as that shown in the paper selection screen 2011 of FIG. 20, or the paper selection screen 2111 of FIG. 21 to be displayed on the console unit 303 via the console unit I/F 406. Next, the processing proceeds to step S2418, and the CPU 401 determines whether or not the page forward key of the paper selection screen is pressed. If it is determined in step S2418 that the page forward key of the paper selection screen is pressed, the processing proceeds to step S2420, and the CPU 401 determines whether or not the display page number N is less than the maximum page size MAX. In a case in which it is determined in step S2420 that the display page number N is less than the maximum page size MAX, the processing proceeds on to step S2421, and the CPU 401 advances the processing on to step S2417 with the page display number N being a page number obtained by adding 1 to N. On the other hand, in a case in which it is determined in step S2420 that the display page number N is not less than the maximum page size MAX, the CPU 401 advances the processing on to step S2417 without changing the display page.

Also, in a case in which in step S2418 it is determined that the page forward key of the paper selection screen is has not been pressed, the processing proceeds on to step S2419, and the CPU 401 determines whether or not the page back key of the paper selection screen is pressed. In a case in which it is determined in step S2419 that the page back key of the paper selection screen is pressed, the processing proceeds on to step S2423, and the CPU 401 determines whether or not the display page number N is greater than or equal to 2. In a case in which it is determined in step S2423 that the display page number N is greater than or equal to 2, the processing proceeds on to step S2424 and the CPU 401 advances the processing on to step S2417 with the page display number N being a page number obtained by subtracting 1 from N. In a case in which it is determined in step S2423 that the display page number N is not greater than or equal to 2, the CPU 401 advances the processing on to step S2417 without changing the display page.

In a case in which it is determined in step S2419 that the page back key of the paper selection screen is not pressed, the processing proceeds on to step S2422, and the CPU 401 determines whether or not the "OK" key of the paper selection screen is pressed. In a case in which it is determined in step S2422 that the "OK" key of the paper selection screen is pressed, the processing proceeds on to step S2425, and the CPU 401 closes the paper selection screen and advances the processing on to step S2426. On the other hand, in a case in which it is determined in step S2422 that the "OK" key of the paper selection screen is not pressed, the CPU 401 advances the processing on to step S2418. In step S2426, the CPU 401 determines whether or not the start key 503 of the console unit 303 is pressed. In a case in which it is determined in step S2426 that the start key 503 is pressed, the CPU 401 advances the processing on to step S2427. On the other hand, in a case in which in step S2426 it is determined that the start key 503 of the console unit 303 is not pressed, the CPU 401 advances the processing on to step S2401 and waits for input from the user. Next, in step S2427, the CPU 401 completes the processing by performing the print processing shown in FIGS. 13A and 13B.

According to the third embodiment, as explained above, it is possible to display a paper selection screen in which the paper feed decks are divided into groups by paper type and by paper size. Also, it is possible to display paper of different paper sizes and different paper types on the head page of the paper selection screen. As a result, it is possible for a user to quickly select a target paper feed deck from out of a plurality of paper feed decks. Because of this, it is possible to improve user convenience and work efficiency when selecting a desired paper feed tray from out of a plurality of paper feed trays.

Other Embodiments

In the first through third embodiments, described above, examples were given of image forming apparatuses having an image input unit and an image output unit (copy machines or multi-function peripherals), but the present invention is not limited to this. The present invention may be adopted to an image forming apparatus having only an image output unit (printer).

In the second embodiment, an example is given with tab paper print, OHP interleave, and front cover as functions for which there are paper type restrictions or paper size restrictions, but the present invention is not limited to this. Functions may be chosen in accordance with the specifications of the image forming apparatus.

A number of embodiments have be explained above, but these embodiments may be combined and worked as appropriate. For example, while in the first embodiment, because display is on a page level, the selected paper feed decks in FIG. 8 and FIG. 9 are displayed in order of their IDs, the selected paper feed deck may be displayed at the head of the list, as in FIG. 14 and FIG. 15 of the second embodiment.

Also, in the second and third embodiments, in a case in which display is done of each paper feed deck information item having the same paper type, it may be made so that the user can selectively register for the display order to be in order of increasing or decreasing paper sizes.

Also, in the second and third embodiments, in a case in which the list is displayed for each paper type group, it may be made so that the user can selectively register for the display order to be in order of increasing grammages or decreasing grammages.

Aspects of the present invention can also be realized by a computer of a system or an apparatus (or devices, such as a CPU or a micro-processing unit (MPU)) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to the computer, for example, via a network or from a recording medium of various types serving as the memory device (for example, a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such changes and equivalent structures and functions.

What is claimed:

1. An image forming apparatus comprising:
   (A) a display;
   (B) a plurality of sheet holding units including an initial group of sheet holding units and other sheet holding units; and
   (C) a controller including a processor, the controller being configured to:
      (a) display on the display a first screen that includes information of a predetermined kind of the initial group of sheet holding units and does not include information of the predetermined kind of the other sheet holding units;
      (b) in response to receiving a user instruction while the first screen is displayed, display on the display a second screen that includes information of the predetermined kind of each of at least one of the other sheet holding units;
      (c) detect a predetermined event that occurred at one of the plurality of sheet holding units;
      (d) determine, based on information specifying the one of the plurality of sheet holding units at which the predetermined event has been detected, a third screen to be displayed,
   wherein the one sheet holding unit at which the predetermined event has been detected is not included in the initial group of sheet holding units but is included in the other sheet holding units,
   wherein the determined third screen includes information of the predetermined kind of each of some of the other sheet holding units including the one sheet holding unit, and does not include information of the predetermined kind of sheet holding units other than the some sheet holding units even if the determination is made in a situation that information of any one of the some of the other sheet holding units including the one sheet holding unit is not displayed; and
      (e) display the determined third screen on the display.

2. The image forming apparatus according to claim 1, wherein the predetermined event is an event in which the one of the plurality of sheet holding units has run out of sheets.

3. The image forming apparatus according to claim 1, wherein the predetermined event is an event in which a sheet jams in the one of the plurality of sheet holding units.

4. The image forming apparatus according to claim 1, wherein the controller is further configured (f) to display a list including information of one of the plurality of sheet holding units in which an empty state occurs, in a state in which the information of the one of the plurality of sheet holding units, in which the empty state occurs, is visually emphasized.

5. The image forming apparatus according to claim 1, wherein the controller is further configured (f) to display a sheet selection screen including sheet information set in association with a sheet holding unit, of the plurality of sheet holding units.

6. The image forming apparatus according to claim 5, wherein the sheet information includes a weight of a sheet held in a sheet holding unit.

7. The image forming apparatus according to claim 1, wherein the user instruction is an instruction for displaying the information of the predetermined kind of at least one sheet holding unit of the other sheet holding units.

8. The image forming apparatus according to claim 1, wherein the controller is further configured (f) to display, on the display, information of the predetermined kind of each of sheet holding units other than sheet holding units for which the information was displayed on the display before accepting a predetermined instruction, and
wherein the display is configured to display up to a predetermined number of sheet holding units, in accordance with having accepted the predetermined instruction from the user.

9. The image forming apparatus according to claim 1, wherein the information of the predetermined kind is information, that is related to a sheet, set to a corresponding sheet holding unit.

10. A method of controlling an image forming apparatus having a display and a plurality of sheet holding units including an initial group of sheet holding units and other sheet holding units, the method comprising:
displaying on the display a first screen that includes information of a predetermined kind of the initial group of sheet holding units and does not include information of the predetermined kind of the other sheet holding units;
displaying, in response to receiving a user instruction while the first screen is displayed, on the display, a second screen that includes information of the predetermined kind of each of at least one of the other sheet holding units;
detecting a predetermined event that occurs at one of the plurality of sheet holding units;
determining, based on information specifying the one of the plurality of sheet holding units at which the predetermined event has been detected, a third screen to be displayed,
wherein, the one sheet holding unit at which the predetermined event has been detected is not included in the initial group of sheet holding units but is included in the other sheet holding units, wherein the determined third screen includes information of the predetermined kind of each of some of the other sheet holding units including the one sheet holding unit, and does not include information of the predetermined kind of sheet holding units other than the some sheet holding units even if the determination is made in a situation that information of any one of the some of the other sheet holding units including the one sheet holding unit is not displayed; and
displaying the determined third screen on the display.

11. The method according to claim 10, wherein the predetermined event is an event in which the one of the plurality of sheet holding units has run out of sheets.

12. The method according to claim 10, wherein the predetermined event is an event in which a sheet jams in the one of the plurality of sheet holding units.

13. The method according to claim 10, further comprising displaying a list including information of one of the plurality of sheet holding units in which an empty state occurs, in a state in which the information of the one of the plurality of sheet holding units, in which the empty state occurs, is visually emphasized.

14. The method according to claim 10, further comprising displaying a sheet selection screen including sheet information set in association with a sheet holding unit of the plurality of sheet holding units.

15. The method according to claim 14, wherein the sheet information includes a weight of a sheet held in a sheet holding unit.

16. The method according to claim 10, wherein the user instruction is an instruction for displaying the information of the predetermined kind of at least one sheet holding unit of the other sheet holding units.

17. The method according to claim 10, further comprising displaying on the display (i) information regarding each of sheet holding units other than sheet holding units for which the information was displayed on the display before accepting a predetermined instruction,
wherein the display is configured to display up to a predetermined number of sheet holding units, in accordance with having accepted the predetermined instruction from the user.

18. The method according to claim 10, wherein the information of the predetermined kind is information, that is related to a sheet, set to a corresponding sheet holding unit.

19. An image forming apparatus comprising:
(A) a display;
(B) a plurality of sheet holding units including an initial group of sheet holding units and other sheet holding units; and
(C) a controller including a processor, the controller being configured to:
(a) display on the display a first screen that includes information of a predetermined kind of the initial group of sheet holding units and does not include information of the predetermined kind of the other sheet holding units in response to an instruction from a user for displaying information of sheet holding units while a screen that does not display information of the predetermined kind of the plurality of sheet holding units is displayed, wherein a number of the sheet holding units of the initial group is less than a total number of the plurality of sheet holding units comprised by the image forming apparatus;
(b) in response to receiving a user instruction while the first screen is displayed, display on the display a second screen that includes the predetermined kind of information of at least one of the other sheet holding units;
(c) detect a predetermined event that occurred at one of the plurality of sheet holding units;
(d) select, based on information specifying the one of the sheet holding units at which the predetermined event has been detected, some of the sheet holding units, of which information is to be displayed so that the one sheet holding unit at which the predetermined event has been detected is included in the selected sheet holding units, wherein, the one sheet holding unit at which the predetermined event has been detected is not included in the initial group of sheet holding units but is included in the other sheet holding units, wherein the selected some of the sheet holding units are not identical with the sheet holding units of the initial group and include the one sheet holding unit even if the predetermined event is detected in a situation that information of any one of the selected some of the other sheet holding units including the one sheet holding unit is not displayed; and (e) display on the display a third screen that includes information of the predetermined kind of the selected some of the sheet holding units including the one sheet holding unit, and does not include information of the predetermined kind of sheet holding units other than the selected some sheet holding units.

20. The image forming apparatus according to claim 19, wherein the predetermined event is an event in which the one of the plurality of sheet holding units has run out of sheets.

21. The image forming apparatus according to claim 19, wherein the predetermined event is an event in which a sheet jams in the one of the plurality of sheet holding units.

22. The image forming apparatus according to claim 19, wherein the controller is further configured (f) to display a list including information of one of the plurality of sheet holding units in which an empty state occurs, in a state in which the information of the one of the plurality of sheet holding units, in which the empty state occurs, is visually emphasized.

23. The image forming apparatus according to claim 19, wherein the controller is further configured (f) to display a sheet selection screen including sheet information set in association with a sheet holding unit, of the plurality of sheet holding units.

24. The image forming apparatus according to claim 19, wherein the sheet information includes a weight of a sheet held in a sheet holding unit.

25. The image forming apparatus according to claim 19, wherein the user instruction is an instruction for displaying the information of the predetermined kind of at least one sheet holding unit, of the other sheet holding units.

26. The image forming apparatus according to claim 19, wherein the controller is further configured (f) to display, on the display, information of the predetermined kind of each of sheet holding units other than sheet holding units for which the information was displayed on the display before accepting a predetermined instruction, and wherein the display is configured to display up to a predetermined number of sheet holding units, in accordance with having accepted the predetermined instruction from the user.

27. The image forming apparatus according to claim 19, wherein the information of the predetermined kind is information, that is related to a sheet, set to a corresponding sheet holding unit.

28. The image forming apparatus according to claim 19, wherein the screen that does not display information of the predetermined information of the plurality of sheet holding units is a copy screen.

* * * * *